US011520707B2

(12) United States Patent
Satpathy et al.

(10) Patent No.: US 11,520,707 B2
(45) Date of Patent: Dec. 6, 2022

(54) SYSTEM ON A CHIP (SOC) COMMUNICATIONS TO PREVENT DIRECT MEMORY ACCESS (DMA) ATTACKS

(71) Applicant: Meta Platforms Technologies, LLC, Menlo Park, CA (US)

(72) Inventors: Sudhir Satpathy, Redmond, WA (US); Wojciech Stefan Powiertowski, Kirkland, WA (US); Neeraj Upasani, Redmond, WA (US); Dinesh Patil, Sunnyvale, CA (US)

(73) Assignee: META PLATFORMS TECHNOLOGIES, LLC, Menlo Park, CA (US)

( * ) Notice: Subject to any disclaimer, the term of this patent is extended or adjusted under 35 U.S.C. 154(b) by 552 days.

(21) Appl. No.: 16/694,744

(22) Filed: Nov. 25, 2019

(65) Prior Publication Data

US 2021/0149824 A1 May 20, 2021

Related U.S. Application Data

(60) Provisional application No. 62/935,964, filed on Nov. 15, 2019.

(51) Int. Cl.
*G06F 12/14* (2006.01)
*G06F 12/1081* (2016.01)
(Continued)

(52) U.S. Cl.
CPC ....... *G06F 12/1408* (2013.01); *G02B 27/017* (2013.01); *G06F 12/1081* (2013.01);
(Continued)

(58) Field of Classification Search
CPC ............. G06F 12/1408; G06F 12/1081; G06F 15/7807; G02B 27/017; G06T 19/006; H04L 63/0435
See application file for complete search history.

(56) References Cited

U.S. PATENT DOCUMENTS 5,136,714 A 8/1992 Braudaway et al.
5,214,759 A 5/1993 Yamaoka et al.
(Continued)

FOREIGN PATENT DOCUMENTS

AU 2004297922 B2 7/2008
CN 107040446 A * 8/2017 ......... H04L 12/4633
(Continued)

OTHER PUBLICATIONS

Notice of Allowance dated Apr. 5, 2022 for U.S. Appl. No. 16/720,635, filed Dec. 19, 2019, 6 pages.
Response to Final Office Action dated Feb. 21, 2022 for U.S. Appl. No. 16/720,635, filed Dec. 19, 2019, 9 pages.
Office Action from U.S. Appl. No. 16/738,247, dated Apr. 7, 2021, 4 pp.
Notice of Allowance from U.S. Appl. No. 16/738,247, dated Jul. 23, 2021, 9 pp.
(Continued)

*Primary Examiner* — Henry Tsai
*Assistant Examiner* — John B Roche
(74) *Attorney, Agent, or Firm* — Shumaker & Sieffert, P.A.

(57) ABSTRACT

This disclosure describes system on a chip (SOC) communications that prevent direct memory access (DMA) attacks. An example SoC includes an encryption engine and a security processor. The encryption engine is configured to encrypt raw input data using a cipher key to form an encrypted payload. The security processor is configured to select the cipher key from a key store holding a plurality of cipher keys based on a channel ID describing a {source subsystem, destination subsystem} tuple for the encrypted payload, to form an encryption header that includes the channel ID, to encapsulate the encrypted payload with the encryption header that includes the channel ID to form a crypto packet, and to transmit the crypto packet to a destination SoC that is external to the SoC.

22 Claims, 9 Drawing Sheets

(51) Int. Cl.
  *G06T 19/00* (2011.01)
  *G06F 15/78* (2006.01)
  *G02B 27/01* (2006.01)
  *H04L 9/40* (2022.01)
(52) U.S. Cl.
  CPC ........ *G06F 15/7807* (2013.01); *G06T 19/006* (2013.01); *H04L 63/0435* (2013.01)

(56) References Cited

U.S. PATENT DOCUMENTS

| | | | |
|---|---|---|---|
| 5,617,537 A | 4/1997 | Yamada et al. | |
| 7,302,548 B1 | 11/2007 | Mitten et al. | |
| 7,711,443 B1 | 5/2010 | Sanders et al. | |
| 7,716,506 B1 | 5/2010 | Surgutchik et al. | |
| 7,716,509 B2 | 5/2010 | Inagaki et al. | |
| 8,244,305 B2 | 8/2012 | Ramesh et al. | |
| 9,111,548 B2 | 8/2015 | Nandy et al. | |
| 10,241,941 B2 | 3/2019 | Fader et al. | |
| 10,367,811 B2 * | 7/2019 | Clark | H04W 4/70 |
| 10,372,656 B2 | 8/2019 | Varadarajan et al. | |
| 10,505,847 B1 * | 12/2019 | Singarayan | H04L 45/745 |
| 10,840,917 B1 | 11/2020 | Cali et al. | |
| 2002/0091826 A1 | 7/2002 | Comeau et al. | |
| 2003/0031320 A1 | 2/2003 | Fan et al. | |
| 2005/0111472 A1 | 5/2005 | Krischer et al. | |
| 2005/0169483 A1 | 8/2005 | Malvar et al. | |
| 2005/0244018 A1 | 11/2005 | Fischer et al. | |
| 2006/0014522 A1 | 1/2006 | Krischer et al. | |
| 2008/0209203 A1 | 8/2008 | Haneda | |
| 2008/0276108 A1 | 11/2008 | Surgutchik et al. | |
| 2010/0111329 A1 | 5/2010 | Namba et al. | |
| 2011/0087846 A1 | 4/2011 | Wang et al. | |
| 2011/0145777 A1 | 6/2011 | Iyer et al. | |
| 2013/0073886 A1 | 3/2013 | Zaarur | |
| 2014/0101354 A1 | 4/2014 | Liu et al. | |
| 2015/0112671 A1 | 4/2015 | Johnston et al. | |
| 2015/0134765 A1 | 5/2015 | Holmberg et al. | |
| 2015/0213811 A1 | 7/2015 | Elko et al. | |
| 2015/0355800 A1 | 12/2015 | Cronin | |
| 2016/0055106 A1 | 2/2016 | Ansari et al. | |
| 2016/0134966 A1 | 5/2016 | Fitzgerald et al. | |
| 2016/0378695 A1 | 12/2016 | Fader et al. | |
| 2017/0358141 A1 | 12/2017 | Stafford et al. | |
| 2018/0122271 A1 | 5/2018 | Ghosh et al. | |
| 2018/0145951 A1 | 5/2018 | Varadarajan et al. | |
| 2019/0289393 A1 | 9/2019 | Amarilio et al. | |
| 2019/0335287 A1 | 10/2019 | Jung et al. | |
| 2020/0027451 A1 | 1/2020 | Cantu | |
| 2021/0011556 A1 | 1/2021 | Atlas et al. | |
| 2021/0089366 A1 | 3/2021 | Wang et al. | |
| 2021/0089475 A1 | 3/2021 | Mathur et al. | |

FOREIGN PATENT DOCUMENTS

| | | | | |
|---|---|---|---|---|
| KR | 1020090061253 | * | 6/2009 | ........... H04L 63/029 |
| WO | 2005/057964 A1 | | 6/2005 | |
| WO | 2012/061151 A1 | | 5/2012 | |

OTHER PUBLICATIONS

U.S. Appl. No. 16/506,618, filed Jul. 9, 2019, by Atlas et al.
U.S. Appl. No. 16/738,247, filed Jan. 9, 2019, by Mathur.
U.S. Appl. No. 16/726,492, filed Dec. 24, 2019, by Wang et al.
U.S. Appl. No. 16/720,635, filed Dec. 19, 2019, by Mathur et al.
McGrew et al., "The Galois/Counter Mode of Operation (GCM)," Conference Proceedings 2005, 2005.
Kite, "Understanding PDM Digital Audio," Audio Precision, Jan. 11, 2012, 9 pp.
Waterman et al., "The RISC-V Instruction Set Manual, vol. II: Privileged Architecture. Version 1.10 Chapter 7," May 7, 2017, 13 pp.
IEEE Std 802.11 ad-2012: "Part 11: Wireless LAN Medium Access Control (MAC) and Physical Layer (PHY) Specifications—Amendment 3: Enhancements for Very High Throughput in the 60 GHz Band", LAN/MAN Standards Committee of the IEEE Computer Society, Dec. 28, 2012, 628 Pages.
"SMS4 Encryption Algorithm for Wireless Networks," Version 1.03, May 15, 2008, 6 pp. (translated by Diffie et al.).
Aoki et al., "Specification of Camellia—a 128-bit Block Cipher," NTT and Mitsubishi Electric Corporation, Sep. 26, 2001, 35 pp.
Response to Office Action dated Sep. 30, 2021 for U.S. Appl. No. 16/720,635, filed Dec. 19, 2019, 12 pages.
U.S. Appl. No. 17/457,599, filed Dec. 3, 2021, naming inventors Patil et al.
U.S. Appl. No. 17/535,805, filed Nov. 26, 2021, naming inventor Mathur.
Office Action from U.S. Appl. No. 16/720,635, dated Sep. 30, 2021, 44 pp.
"Allocate," Dictionary.com, 2022, 5 pages. URL:https://www.dictionary.com/browse/allocate.
Czapski P., et al., "Power Optimization Techniques in FPGA Devices: A Combination of System- and Low-Levels," Jan. 2007, 8 pages. URL: https://www.researchgate.net/publication/288341764_Power_Optimization_Techniques_in_FPGA_Devices_A_Combination_of_System-_and_Low-_Levels.
Jzbiciak., "Frequency vs. Power Consumption," Feb. 26, 2012, 3 pages. URL: https://lwn.net/Articles/483889/.
Final Office Action dated Jan. 21, 2021 for U.S. Appl. No. 16/720,635, filed Dec. 19, 2021, 21 Pages.
Response to Office Action dated Apr. 7, 2021, from U.S. Appl. No. 16/738,247, filed Jun. 7, 2021, 8 pp.
"Announcing the Advanced Encryption Standard (AES)," Federal Information Processing Standards Publication 197, Nov. 26, 2001, 51 pp.
U.S. Appl. No. 16/860,983, filed Apr. 28, 2020, by Patil et al.
U.S. Appl. No. 16/860,991, filed Apr. 28, 2020, by Patil et al.
Office Action from U.S. Appl. No. 16/738,247, dated Oct. 9, 2020, 8 pp.
Response to Office Action dated Oct. 9, 2020 from U.S. Appl. No. 16/738,247, filed Jan. 11, 2021, 10 pp.
Qiu et al., "Low-Power Low-Latency Data Allocation for Hybrid Scratch-Pad Memory," IEEE Embedded Systems Letters vol. 6, Issue: 4, Dec. 2014, pp. 69-72.

* cited by examiner

SYSTEM ON A CHIP (SOC) COMMUNICATIONS TO PREVENT DIRECT MEMORY ACCESS (DMA) ATTACKS

This application claims the benefit of U.S. Provisional Patent Application No. 62/935,964 filed on 15 Nov. 2019, the entire contents of which are incorporated by reference herein.

TECHNICAL FIELD

This disclosure generally relates to data encryption and decryption implemented in various types of computing systems.

BACKGROUND

Many computing systems incorporate content protection or digital rights management technology that includes data encryption and decryption hardware and software. This encryption protects secure data, which is potentially sensitive, private, and/or right-managed and is stored or used on the system, from unauthorized access and exploitation. Examples of computing systems that incorporate encryption and decryption include artificial reality systems. In general, artificial reality is a form of reality that has been adjusted in some manner before presentation to a user, which may include, e.g., a virtual reality, an augmented reality, a mixed reality, a hybrid reality, or some combination and/or derivatives thereof. Artificial reality systems include one or more devices for rendering and displaying content to users. Examples of artificial reality systems may incorporate a head-mounted display (HMD) worn by a user and configured to output artificial reality content to the user. In some examples, the HMD may be coupled (e.g. wirelessly or in tethered fashion) to a peripheral device that performs one or more artificial reality-related functions.

SUMMARY

In general, this disclosure describes systems on a chip (SoCs) that communicate with each other using encrypted data in a way that is resistant to various types of direct memory access (DMA) attacks that attempt to break cross-subsystem data secrecy within a single SoC. The SoCs of this disclosure format the encryption header of each crypto packet to include a "channel ID" field. The channel ID field is populated with channel ID information that is unique to a {source, destination} tuple for the respective packet, where each of the source and destination information indicates a particular subsystem of the sending SoC and the destination SoC, respectively. A security processor of the source SoC selects a different secret key to be applied during encryption for data on each different outgoing channel ID, and a security processor of the destination SoC selects a different secret key to be applied during decryption for data on each incoming channel ID. By indicating the channel ID in a dedicated field of the header of the crypto packet, the security processor of the sending SoC provides a security processor of the destination SoC with encryption header data that can be parsed to obtain the channel ID, and to thereby identify the unique key to be used for decrypting the payload. In this way, the security processors of this disclosure tunnel encrypted traffic and select unique keys for the tunneled traffic on a per-channel basis, where each channel represents a unique pair of subsystems, each subsystem being positioned in a different SoC.

In some implementations, the SoCs of this disclosure implement a multistage process to thwart DMA attacks that attempt to short circuit traffic within the sending SoC to reroute traffic originating from a first subsystem in the sending SoC to "loop back" to a second subsystem's allocated space within the same SoC's shared memory. According to this multistage process, the sending SoC computes a cryptographic signature using a 1-bit source identifier, the channel ID, and the unique key selected based on the channel ID, and signs the entire packet (header and encrypted payload) using the cryptographic signature. The sending SoC thereby provides data that the destination SoC can use to verify that the cryptographic signature is generated using all of the correct source SoC-identifier, the correct channel ID, and the correct encryption key.

As such, the SoCs of this disclosure enforce strict traffic flow constraints that foil DMA attacks that attempt to cross-contaminate discrete address spaces in shared memory allocated to different subsystems of the same SoC. In this way, the SoCs implement techniques of this disclosure to maintain the integrity of a single SoC's subsystems, which are configured to be mutually distrusting from a data-access perspective, while supporting maintaining multi-key encryption/decryption with respect to cross-SoC traffic. The SoCs of this disclosure are described with respect to multi-device artificial reality systems, although it will be appreciated that the SoCs of this disclosure may be implemented in other contexts, as well.

In one example, this disclosure is directed to system on a chip (SoC). The SoC includes an encryption engine configured to encrypt raw input data using a cipher key to form an encrypted payload, and a security processor. The security processor is configured to select the cipher key from a key store holding a plurality of cipher keys based on a channel ID describing a {source subsystem, destination subsystem} tuple for the encrypted payload, to form an encryption header that includes the channel ID, to encapsulate the encrypted payload with the encryption header that includes the channel ID to form a crypto packet, and to transmit the crypto packet to a destination SoC that is external to the SoC.

In another example, this disclosure is directed to an SoC that includes a security processor configured to receive, via an ingress interface, a crypto packet, to decapsulate the crypto packet to obtain an encryption header and an encrypted payload, to parse the encryption header to obtain a channel ID describing a {source subsystem, destination subsystem} tuple for the encrypted payload, and to select a decryption key (which in some instances is referred to as an "inverse cipher key") from a key store holding a plurality of decryption keys based on the channel ID obtained from the encryption header. The SoC further includes a decryption engine configured to decrypt the encrypted payload using the decryption key to form a decrypted payload In another example, this disclosure is directed to an artificial reality system that includes a head-mounted device (HMD) having an HMD system on a chip (SoC). The HMD SoC includes an encryption engine configured to encrypt raw input data using a cipher key to form an encrypted payload, and a first security processor configured to select the cipher key from a key store holding a plurality of cipher keys based on a channel ID describing a {source subsystem, destination subsystem} tuple for the encrypted payload, to form an encryption header that includes the channel ID, to encapsulate the encrypted payload with the encryption header that includes the channel ID to form a crypto packet, and to transmit, via an egress interface, the crypto packet to a destination SoC. The artificial reality system may also include a peripheral device communicatively coupled to the HMD, the peripheral device having a peripheral SoC, where the peripheral SoC is the destination SoC. The peripheral SoC includes a second security processor configured to receive, via an ingress interface, the crypto packet, to decapsulate the crypto packet to obtain the encryption header and the encrypted payload, to parse the encryption header to obtain the channel ID describing the {source subsystem, destination subsystem} tuple for the encrypted payload, and to select a decryption key from a key store holding a plurality of decryption keys based on the channel ID obtained from the encryption header. The peripheral SoC also includes a decryption engine configured to decrypt the encrypted payload using the decryption key to form a decrypted payload.

The SoC configurations of this disclosure provide several technical improvements. As one example, the SoCs of this disclosure improve security by way of resistance against various types of DMA attacks that might otherwise surreptitiously cause cross-contamination of data in partitioned areas of shared memory, thereby breaking the mutual distrust between different subsystems of the same SoC. The SoCs of this disclosure provide the security enhancements using packet structure modifications and digital signatures, thereby eliminating the relatively high overhead requirements of some existing security measures, such as the addition of physical security hardware infrastructure. The security enhancements of this disclosure also do not introduce performance diminishments associated with some existing security measures, such as the disablement of DMA by certain ports, blocking connections to certain ports, or disallowing storage of unencrypted data in random access memory (RAM). In this way, the SoC configurations of this disclosure thwart DMA attacks without increasing hardware overhead requirements and without diminishing device performance.

The details of one or more examples of the techniques of this disclosure are set forth in the accompanying drawings and the description below. Other features, objects, and advantages of the techniques will be apparent from the description and drawings, and from the claims.

DETAILED DESCRIPTION

Figure 1A:
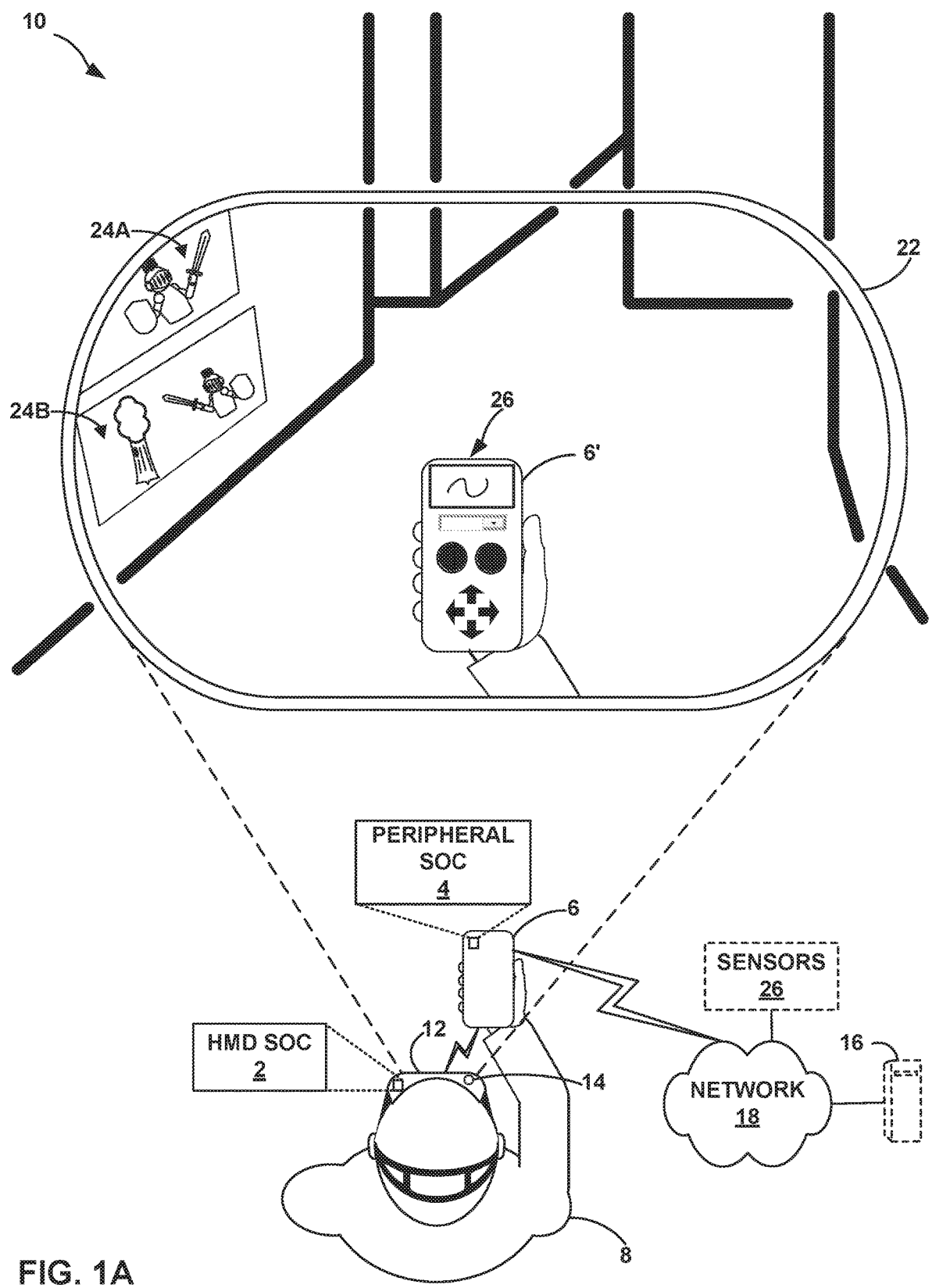
FIG. 1A is an illustration depicting an example multi-device artificial reality system that implements DMA-resistant inter-SoC communications, in accordance with aspects of this disclosure.

Multi-device systems sometimes incorporate content protection or digital rights management technology, such as data encryption and decryption, as part of in-system, inter-device communications. A source device that originates an encrypted communication within the system may implement digital data encryption according to various standardized encryption mechanisms. A destination device that receives the encrypted communication for processing beyond simple relaying performs generally reciprocal or "inverse" steps with respect to the encryption mechanisms, in accordance with the inverse steps specified in the corresponding standard according to which the data was encrypted.

Encrypted inter-device communications are often performed in a packetized manner. The packetized communications are packaged as discrete data units (or "packets"), with each packet conforming to a format/structure. Packets of an inter-device encrypted data flow are referred to herein as "crypto packets." Each crypto packet conforms to a format in which an encrypted payload is encapsulated within an "encryption header." Various non-limiting examples of this disclosure are described with respect to peer-to-peer (P2P) unicast data flows between two devices of multi-device artificial reality systems.

Artificial reality systems are becoming increasingly ubiquitous with applications in many fields such as computer gaming, health and safety, industrial fields, and education. As a few examples, artificial reality systems are being incorporated into mobile devices, gaming consoles, personal computers, movie theaters, and theme parks. In general, artificial reality is a form of reality that has been adjusted in some manner before presentation to a user, and may include one or more of virtual reality (VR), augmented reality (AR), mixed reality (MR), hybrid reality, or some combination and/or derivative thereof.

Typical artificial reality systems include one or more devices for rendering and displaying content to users. As one example, a multi-device artificial reality system of this disclosure may include a head-mounted device (HMD) worn by a user and configured to output artificial reality content to the user, and a peripheral device that operates as a co-processing device when paired with the HMD. The artificial reality content may include completely generated content or generated content combined with captured content (e.g., real-world video and/or real-world images). The peripheral device and the HMD may each include one or more SoC integrated circuits (referred to herein simply as "SoCs") that are collectively configured to provide an artificial reality application execution environment.

Because the HMD and peripheral device communicate secure data (e.g., authentication data) with each other, the respective SoCs of the HMD and the peripheral device send data to one another in the form of crypto packets. To further enhance security, each SoC allocates shared memory (SMEM) to each of the respective SoC's multiple subsystems, and disallows cross-subsystem data access across the partitions implemented in the SMEM. The SoCs of this disclosure are configured to format crypto packets in a way that prevents DMA attacks that attempt to grant one subsystem of a single SoC access to SMEM space allocated to another subsystem of the same SoC.

FIG. 1A is an illustration depicting a multi-device artificial reality system 10, components of which are configured to thwart DMA attacks that attempt to breach cross-partition access restrictions within an SMEM of an SoC. More specifically, components of multi-device artificial reality system 10 prevent DMA attacks that attempt to grant one subsystem of an SoC access to SMEM space which is access-limited to another subsystem of the same SoC. Components of multi-device artificial reality system 10 incorporate SoCs configured to use modified encryption header structures of this disclosure to enforce traffic routing constraints and to enable destination SoCs to drop any malicious or erroneous traffic that might potentially breach the cross-partition SMEM access constraints between different subsystems of the same SoC.

In some examples, the SoCs incorporated into the components of multi-device artificial reality system 10 implement a multistage process to cryptographically sign the entirety of each crypto packet in such a way that the identity of the source SoC, the channel ID, and the unique key selected based on the channel ID are all bound to the crypto packet. An SoC that receives a cryptographically signed crypto packet of this disclosure (regardless of whether it is the intended destination SoC or not) can discard any malicious packets based on detecting a signature mismatch, before potentially breaching cross-subsystem SMEM access to the malicious packet. In this way, the components of multi-device artificial reality system 10 preserve cross-subsystem data secrecy in separate address spaces of the SMEM of a single SoC, to maintain the integrity of an architecture in which a single SoC's subsystems are configured to be mutually distrusting from a data-access perspective.

Multi-device artificial reality system 10 includes head-mounted device (HMD) 12 and peripheral device 6. As shown, HMD 12 is typically worn by user 8, and includes an electronic display and optical assembly for presenting artificial reality content 22 to user 8. In addition, HMD 12 includes one or more sensors (e.g., accelerometers) for tracking motion of HMD 12. HMD 12 may include one or more image capture devices 14, e.g., cameras, line scanners, fundal photography hardware, or the like. Image capture devices 14 may be configured for capturing image data of the surrounding physical environment. In some examples, image capture devices 14 include inward-facing camera hardware and/or scanning hardware configured to capture facial images, retina scans, iris scans, etc. of user 8 for user authentication and for other purposes. HMD 12 is shown in this example as being in communication with (e.g., in wireless communication with or tethered to) peripheral device 6. Peripheral device 6 represents a co-processing device in communication with HMD 12. HMD 12 and/or peripheral device 6 may execute an artificial reality application to construct artificial reality content 22 for display to user 8. For example, HMD 12 and/or peripheral device 6 may construct the artificial reality content based on tracking pose information and computing pose information for a frame of reference, typically a viewing perspective of HMD 12.

As shown in FIG. 1A, one or more devices of multi-device artificial reality system 10 may be connected to a computing network, such as network 18. Network 18 may incorporate a wired network and/or wireless network, such as a local area network (LAN), a wide area network (WAN), a Wi-Fi™ based network or 5G network, an Ethernet® network, a mesh network, a short-range wireless (e.g., Bluetooth®) communication medium, and/or various other computer interconnectivity infrastructures and standards. Network 18 may support various levels of network access, such as to public networks (e.g., the Internet), to private networks (e.g., as may be implemented by educational institutions, enterprises, governmental agencies, etc.), or private networks implemented using the infrastructure of a public network (e.g., a virtual private network or "VPN" that is tunneled over the Internet).

FIG. 1A also illustrates various optional devices that may be included in multi-device artificial reality system 10 or coupled to multi-device artificial reality system 10 via network 18. The optional nature of these devices is shown in FIG. 1A by way of dashed-line borders. One example of an optional device shown in FIG. 1A is console 16. In implementations that include console 16, console 16 may communicate directly with HMD 12 or with peripheral device 6 (and thereby, indirectly with HMD 12) to process artificial reality content that HMD 12 outputs to user 8. Another example of optional hardware shown in FIG. 1A is represented by external sensors 26. Multi-device artificial reality system 10 may use external sensors 26 and/or external camera hardware to capture three-dimensional (3D) information within the real-world, physical environment at which user 8 is positioned.

In general, multi-device artificial reality system 10 uses information captured from a real-world, 3D physical environment to render artificial reality content 22 for display to user 8. In the example of FIG. 1A, a user 8 views the artificial reality content 22 constructed and rendered by an artificial reality application executing on the combination of HMD 12 peripheral device 6. In some examples, artificial reality content 22 may comprise a combination of real-world imagery (e.g., peripheral device 6 in the form of peripheral device representation 6', representations of walls at the physical environment at which user 8 is presently positioned, a representation of the hand with which user 8 holds peripheral device 6, etc.) overlaid with virtual objects (e.g., virtual content items 24A and 24B, virtual user interface 26, etc.) to produce an augmented reality experience or a mixed reality experience displayed to user 8 via display hardware of HMD 12.

In some examples, virtual content items 24A and 24B (collectively, virtual content items 24) may be mapped to a particular position within artificial reality content 22. As examples, virtual content items 24 may be pinned, locked, or placed to/at certain position(s) within artificial reality content 22. A position for a virtual content item may be fixed, as relative to one of the walls of the real-world imagery reproduced in artificial reality content 22, or to the earth, as examples. A position for a virtual content item may be variable, as relative to peripheral device representation 6' or to the tracked gaze or field of view (FoV) of user 8, as non-limiting examples. In some examples, the particular position of a virtual content item within artificial reality content 22 is associated with a position within the real-world, physical environment (e.g., on a surface of a physical object) at which user 8 is positioned presently.

In this example, peripheral device 6 is a physical, real-world device having a surface on which the artificial reality application executing on computing platforms of multi-device artificial reality system 10 overlays virtual user interface 26. Peripheral device 6 may include one or more presence-sensitive surfaces for detecting user inputs by detecting a presence of one or more objects (e.g., fingers, stylus) touching or hovering over locations of the presence-sensitive surface. In some examples, peripheral device 6 may include one or more output devices, such as a display integrated into the presence-sensitive surface to form an input/output (I/O) component of peripheral device 6.

In some examples, peripheral device 6 may have the form factor of various portable devices, such as a smartphone, a tablet computer, personal digital assistant (PDA), or other handheld device. In other examples, peripheral device 6 may have the form factor of various wearable devices, such as a so-called "smartwatch," "smart ring," or other wearable device. In some examples, peripheral device 6 may be part of a kiosk or other stationary or mobile system. While described above as integrating display hardware, peripheral device 6 need not include display hardware in all implementations.

In the example artificial reality experience shown in FIG. 1A, virtual content items 24 are mapped to positions on a visual representation of a wall of the real-world physical environment at which user 8 is positioned. The example in FIG. 1A also shows that virtual content items 24 partially appear on the visual representation of the wall only within artificial reality content 22, illustrating that virtual content items 24 do not represent any items that exist in the real-world, physical environment at which user 8 is positioned. Virtual user interface 26 is mapped to a surface of peripheral device 6 as represented in peripheral device representation 6'. Multi-device artificial reality system 10 renders virtual user interface 26 for display via HMD 12 as part of artificial reality content 22, at a user interface position that is locked relative to the position of a particular surface of peripheral device 6.

FIG. 1A shows that virtual user interface 26 appears overlaid on peripheral device representation 6' (and therefore, only within artificial reality content 22), illustrating that the virtual content represented in virtual user interface 26 does not exist in the real-world, physical environment at which user 8 is positioned. Multi-device artificial reality system 10 may render one or more virtual content items in response to a determination that at least a portion of the location of virtual content items is in the FoV of user 8. For example, multi-device artificial reality system 10 may render virtual user interface 26 on peripheral device 6 only if peripheral device 6 is within the FoV of user 8.

Various devices of multi-device artificial reality system 10 may operate in conjunction in the artificial reality environment, such that each device may be a separate physical electronic device and/or separate integrated circuits within one or more physical devices. In this example, peripheral device 6 is operationally paired with HMD 12 to jointly operate to provide an artificial reality experience. For example, peripheral device 6 and HMD 12 may communicate with each other as co-processing devices. As one example, when a user performs a user interface-triggering gesture in the virtual environment at a location that corresponds to one of the virtual user interface elements of virtual user interface 26 overlaid on peripheral device representation 6', multi-device artificial reality system 10 detects the user interface and performs an action that is rendered and displayed via HMD 12.

Each of peripheral device 6 and HMD 12 may include one or more SoC integrated circuits configured to support aspects of the artificial reality application described above, such as SoCs operating as co-application processors, encryption engines, decryption engines, sensor aggregators, display controllers, etc. Although each of peripheral device 6 and HMD 12 may include multiple SoCs, FIG. 1A only illustrates HMD SoC 2 of HMD 12 and peripheral SoC 4 of peripheral device 6, for ease of illustration and discussion. To preserve security and digital rights, HMD SoC 2 and peripheral SoC 4 are configured to communicate with one another using encrypted data streams, such as by sending crypto packet flows over a wireless link formed using respective peripheral component interface (PCI) express (PCIe) buses of HMD SoC 2 of HMD 12 and peripheral SoC 4. As just one example, HMD SoC 2 may encrypt facial images, retina scans, iris scans, etc. of user 8 (e.g., as captured by inward-facing camera hardware and/or fundal photography hardware of image capture devices 14), and send the encrypted data to peripheral SoC 4 for authentication purposes and optionally, for other purposes as well. In this example, peripheral SoC 4 may decrypt the encrypted data received from HMD SoC 2, and process the decrypted data using facial recognition technology, retinal blood vessel pattern recognition technology, etc. to grant/deny biometric authentication to user 8.

HMD SoC 2 and peripheral SoC 4 are described herein as performing encryption and decryption operations that comply with the standardized encryption and decryption mechanisms described in the advanced encryption standard (AES) established by the United States National Institute of Standards and Technology (NIST) as a non-limiting example. It will be appreciated that HMD SoC 2 and peripheral SoC 4 may, in other examples, implement the traffic constraint-based enhancements of this disclosure while complying with other cipher standards, such as SM4 (formerly SMS4, a block cipher standard set forth in the Chinese National Standard for Wireless LAN WAPI), Camellia (developed by Mitsubishi Electric and NTT Corporation of Japan), etc. The crypto packet manipulation techniques of this disclosure can be implemented in digital logic, and are therefore sufficiently generic to provide DMA attack mitigation with respect to various types of DMA attacks, and within the compliance boundaries of various types of encryption and decryption engines, such as those that comply with the standards listed above and other standardized or non-standardized decryption engines.

While the DMA attack-thwarting data communication techniques of this disclosure are described with respect to being implemented within multi-device artificial reality system 10 as an example, it will be appreciated that the applicability of the techniques of this disclosure are not limited to artificial reality systems. The data communication techniques of this disclosure can also be implemented to improve data security in other types of computing devices, including, but not limited to, various types of battery-powered SoC-driven and/or application specific integrated circuit (ASIC)-driven technologies.

Each of HMD SoC 2 and peripheral SoC 4 includes multiple subsystems, with each subsystem being dedicated to supporting certain functionalities, such as audio processing for the artificial reality experience, moving picture processing for the artificial reality experience, security information for user 8 or others, sensor data collection for environmental awareness, location tracking, etc. Additionally, each of HMD SoC 2 and peripheral SoC 4 implements a single SMEM unit that stores data for all of the respective subsystems of that particular SoC. The various subsystems of HMD SoC 2 are configured to be mutually distrusting, and the various subsystems of peripheral SoC 4 are configured to be mutually distrusting, with respect to SMEM access. As such, each of HMD SoC 2 and peripheral SoC 4 are configured to limit access to discrete address spaces of their respective SMEM units to a specific, single subsystem.

HMD SoC 2 and peripheral SoC 4 implement the techniques of this disclosure to identify crypto packet flows between one another at a subsystem-to-subsystem level of granularity. For example, HMD SoC 2 may identify each outgoing crypto packet based on a tuple including the particular subsystem of HMD SoC 2 that originated the crypto packet and the particular subsystem of peripheral SoC 4 that is the destination of the crypto packet. Similarly, peripheral SoC 4 may identify each outgoing crypto packet based on a tuple including the particular subsystem of peripheral SoC 4 that originated the crypto packet and the particular subsystem of HMD SoC 2 that is the destination of the crypto packet. The {source subsystem, destination subsystem} tuple is referred to herein as a "channel ID." According to the techniques of this disclosure, HMD SoC 2 and peripheral SoC 4 identify the channel ID of each communicated crypto packet by inserting a channel ID field in the encryption header of each crypto packet.

To strengthen data security and attack resistance, HMD SoC 2 and peripheral SoC 4 implement multi-key encryption and decryption according to the configurations of this disclosure. Each of HMD SoC 2 and peripheral SoC 4 implements an AES engine that performs encryption operations for outgoing (transmission path or "Tx") traffic and decryption operations for incoming (receipt path or "Rx") traffic. The respective AES engines of HMD SoC 2 and peripheral SoC 4 select a key for encryption/decryption operations based on the channel ID assigned to a crypto packet. For encryption operations, the AES engines select a cipher key based on the channel ID that will be inserted in the encryption header after encapsulation. For decryption operations, the AES engines select a decryption key based on the channel ID extracted from the encryption header during decapsulation of a received crypto packet.

Unique AES keys are thereby selected on a per-channel ID basis, because no two channel IDs are the same. For instance, even if the same two subsystems are inverted in the {source, destination} for reciprocal traffic flows, the respective crypto packets of these traffic flows are assigned different channel IDs based on their opposing directions. In this way, HMD SoC 2 and peripheral SoC 4 tunnel traffic on a per-subsystem pair basis, to prevent DMA attacks that might attempt to break the cross-subsystem data isolation within each of HMD SoC 2 and peripheral SoC 4, while maintaining multi-key encryption/decryption with respect to cross-SoC traffic.

In some implementations, HMD SoC 2 and peripheral SoC 4 are configured according to aspects of this disclosure to thwart a particular type of DMA attack referred to herein as a DMA "loopback" attack. DMA loopback attacks attempt to short circuit traffic within HMD SoC 2 or within peripheral SoC 4 by reroute traffic originating from a first subsystem to "loop back" to the same SoC's SMEM, to be stored in SMEM address space allocated to a second subsystem of the same SoC. DMA loopback attacks may attempt to reroute traffic within HMD SoC 2 or within peripheral SoC 4 using various mechanisms, such as spoofing or others.

The respective AES engines of HMD SoC 2 and peripheral SoC 4 implement a multistage process of this disclosure to mitigate DMA loopback attacks. First, the AES engines of HMD SoC 2 and peripheral SoC 4 self-identify the source SoC by embed a 1-bit field in the encryption header of each crypto packet as part of encapsulation. Next, the AES engines of HMD SoC 2 and peripheral SoC 4 compute a cryptographic signature by applying the channel ID-selected key to the source SoC-identifying bit and the channel ID information embedded in the encryption header. Finally, the AES engines of HMD SoC 2 and peripheral SoC 4 sign the entire crypto packet (plain-text encryption header and encrypted payload) using the cryptographic signature.

The AES engine of the receiving SoC can extract the source SoC-identifying bit from the encryption header, and verify that the cryptographic signature is generated using the correct combination of the source SoC-identifying bit, channel ID, and AES key. By cryptographically binding both the source SoC and the channel ID to a packet using the signature of this disclosure, the AES engines of HMD SoC 2 and peripheral SoC 4 enforce traffic flow constraints that enable the receiving AES engine to drop malicious packets detected based on a signature mismatch. HMD SoC 2 and peripheral SoC 4 implement the cryptographic binding operations of this disclosure in their respective AES engines in order to segregate these functionalities from microcontroller components of HMD SoC 2 and peripheral SoC 4, which are the components most often targeted by DMA loopback attacks.

Figure 1B:
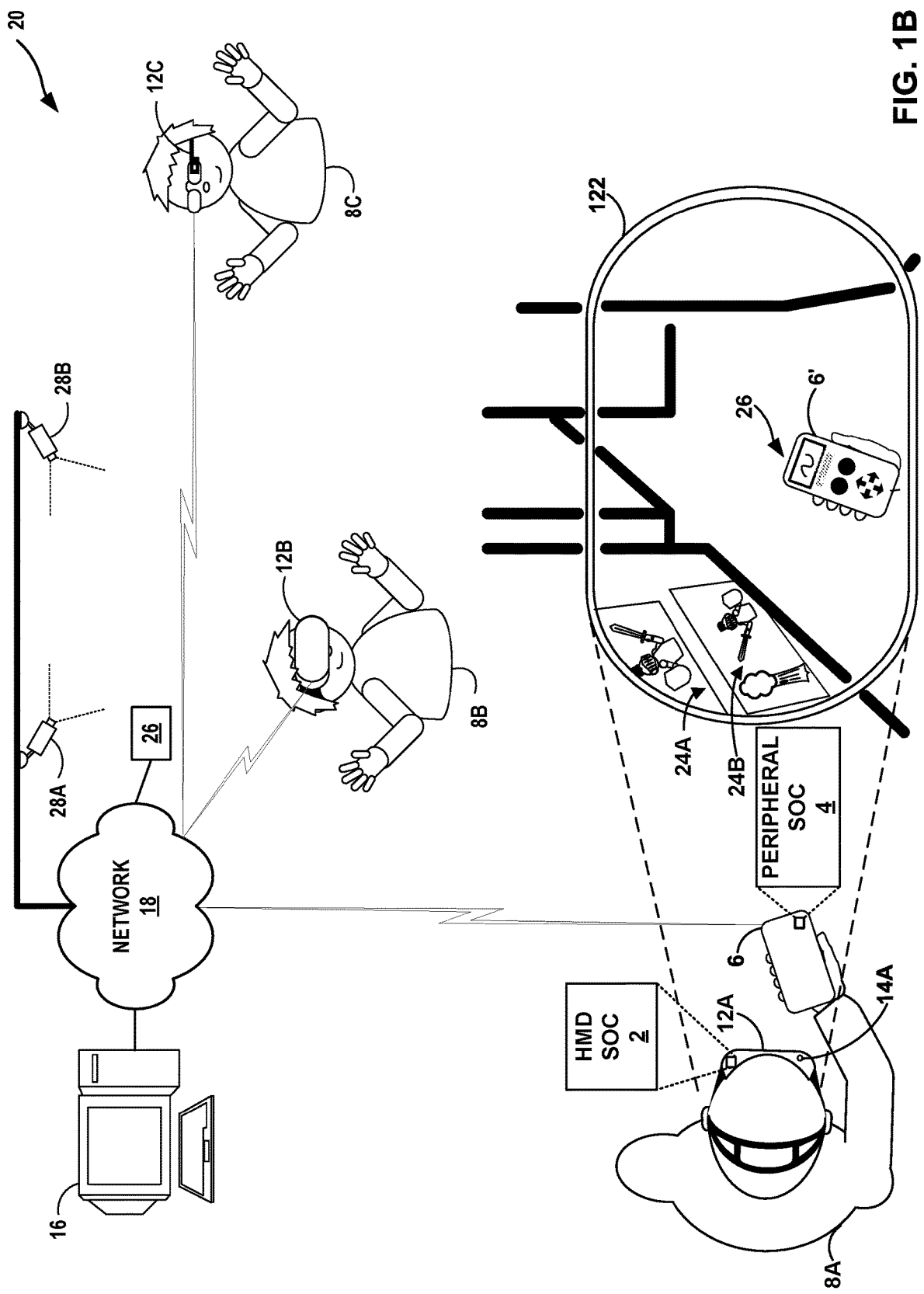
FIG. 1B is an illustration depicting another example multi-device artificial reality system that implements DMA-resistant inter-SoC communications, in accordance with aspects of this disclosure.

FIG. 1B is an illustration depicting another example multi-device artificial reality system 20 that includes components configured to thwart DMA attacks that attempt to breach cross-partition access restrictions within an SMEM of an SoC. Similar to multi-device artificial reality system 10 of FIG. 1A, HMD SoC 2 and peripheral SoC 4 included, respectively, in HMD 12A and peripheral device 6 of FIG. 1B may implement the crypto packet configurations of this disclosure to improve data security, such as by improving resistance to DMA attacks, including but not limited to DMA loopback attacks. HMD SoC 2 and peripheral SoC 4 may tunnel crypto packet traffic between each other on a per-channel ID basis, using channel ID-unique keys for encryption and decryption operations, thereby thwarting DMA attacks. In some examples, HMD SoC 2 and peripheral SoC 4 may apply the cryptographic signature described above to each crypto packet communicated between them, to thwart DMA loopback attacks.

In the example of FIG. 1B, multi-device artificial reality system 20 includes external cameras 28A and 28B (collectively, "external cameras 28"), HMDs 12A-12C (collectively, "HMDs 12"), console 16, and sensors 26. As shown in FIG. 1B, multi-device artificial reality system 20 represents a multi-user environment in which an artificial reality application executing on console 16 and/or HMDs 12 presents artificial reality content to each of users 8A-8C (collectively, "users 8") based on a current viewing perspective of a corresponding frame of reference for the respective user 8. That is, in this example, the artificial reality application constructs artificial reality content by tracking and computing pose information for a frame of reference for each of HMDs 12. Multi-device artificial reality system 20 uses data received from external cameras 28 and/or HMDs 12 to capture 3D information within the real-world environment, such as motion by users 8 and/or tracking information with respect to users 8, for use in computing updated pose information for a corresponding frame of reference of HMDs 12.

HMDs 12 operate concurrently within multi-device artificial reality system 20. In the example of FIG. 1B, any of users 8 may be a "player" or "participant" in the artificial reality application, and any of users 8 may be a "spectator" or "observer" in the artificial reality application. HMDs 12 of FIG. 1B may each operate in a substantially similar way to HMD 12 of FIG. 1A. For example, HMD 12A may operate substantially similar to HMD 12 of FIG. 1A, and may receive user inputs by tracking movements of the hands of user 8A.

Each of HMDs 12 implements a respective user-facing artificial reality platform (or co-implements the platform with a co-processing device, as in the case of HMD 12A with peripheral device 6), and outputs respective artificial content, although only artificial reality content 22 output by HMD 12A is shown in FIG. 1B, purely for the purpose of ease of illustration. As shown in FIG. 1B, two or more of HMDs 12 may, but need not necessarily, conform to the same form factor. Various form factors of HMDs 12 are shown in FIG. 1B, including a headset form factor and an eyeglass form factor. In some use case scenarios, HMDs 12B and/or 12C may also be paired (e.g. wirelessly coupled or tethered to) a portable device that implements generally corresponding features to those described with respect to peripheral device 6.

Figure 2:
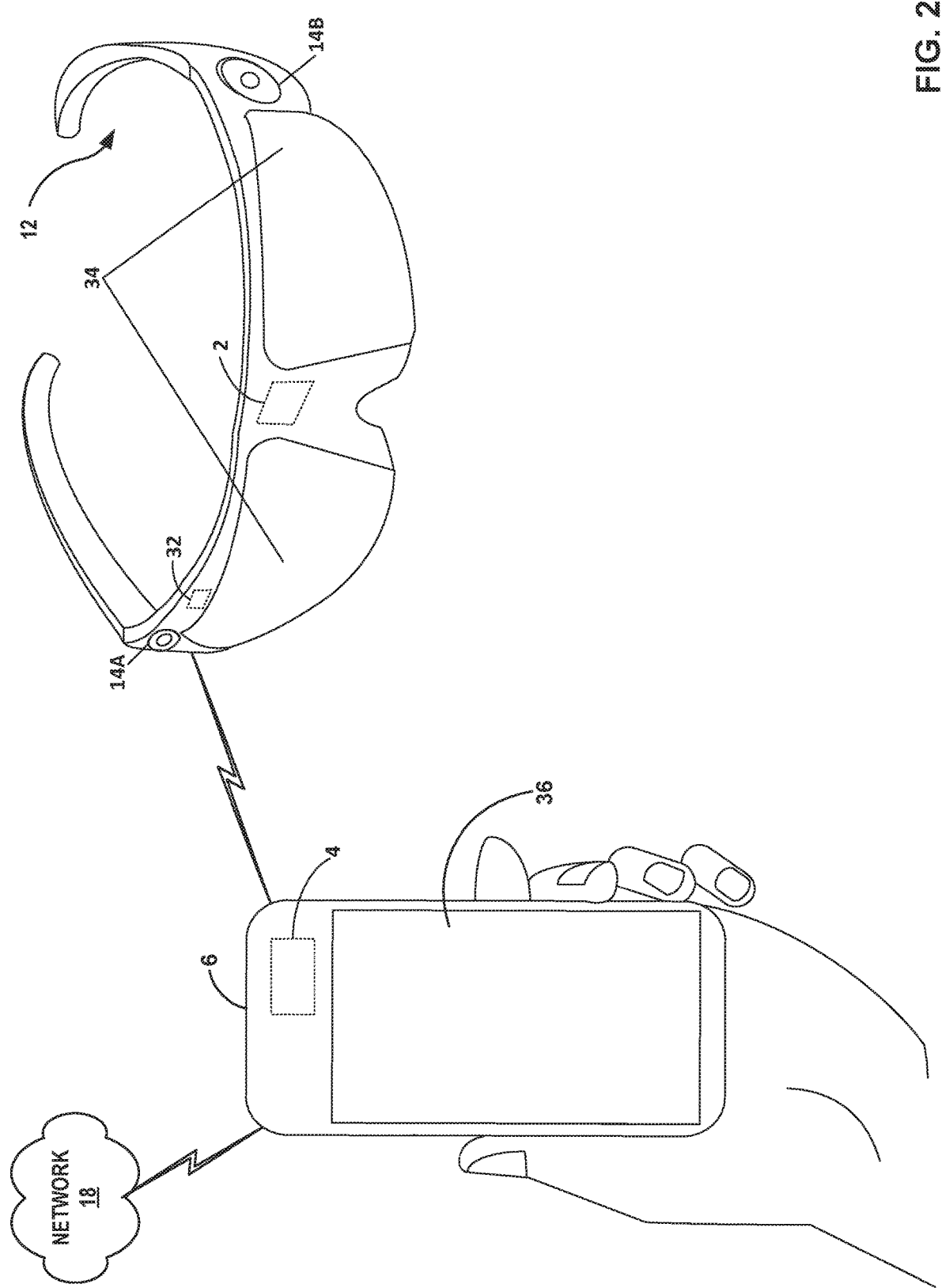
FIG. 2 is an illustration depicting an example of the HMD of FIG. 1A in communication with the peripheral device of FIG. 1A according to the data communication aspects of the disclosure.

FIG. 2 is an illustration depicting an example of HMD 12 in communication with peripheral device 6 according to the data communication aspects of the disclosure. HMD 12 of FIG. 2 may be an example of any of HMDs 12 of FIGS. 1A and 1B. In some examples, HMD 12 and peripheral device 6 may be part of an artificial reality system that incorporates other devices and network intermediaries, such as in the examples of artificial reality systems 10 and 20 illustrated in FIGS. 1A and 1B. In other examples, HMD 12 and peripheral device 6 may operate as a tandem, mobile artificial realty system configured to implement the DMA-resistant data communication techniques described herein.

In this example, HMD 12 includes a front rigid body and two stems to secure HMD 12 to user 8 e.g., by resting over the ears of user 8. In addition, HMD 12 includes an interior-facing electronic display 34 configured to present artificial reality content to user 8. Electronic display 34 may include, be, or be part of any suitable display technology, such as liquid crystal displays (LCD), quantum dot display, dot matrix displays, light emitting diode (LED) displays, organic light-emitting diode (OLED) displays, cathode ray tube (CRT) displays, e-ink, or monochrome, color, or any other type of display capable of generating visual output. In some examples, electronic display 34 includes a stereoscopic display for providing separate images to each eye of user 8. In some examples, the known orientation and position of display 34 relative to the front rigid body of HMD 12 is used as a frame of reference, also referred to as a local origin, when tracking the position and orientation of HMD 12 for rendering artificial reality content according to a current viewing perspective of HMD 12 and user 8.

HMD 12 takes the form factor of eyeglasses in the example of FIG. 2. In some examples, electronic display 34 may be split into multiple segments, such as into two segments, with each segment corresponding to a separate lens disposed on the rigid front body of HMD 12. In other examples in accordance with FIG. 2, electronic display 34 may form a contiguous surface that spans both lenses and the lens-connecting bridge (i.e., the over-the-nose portion) of the rigid front body of HMD 12. In some examples in accordance with the form factor illustrated in FIG. 2, electronic display 34 may also encompass portions of HMD 12 that connect the lenses of the front rigid body to the stems, or optionally, portions of the stems themselves. These various designs of electronic display 34 in the context of the form factor of HMD 12 shown in FIG. 2 improve accessibility for users having different visual capabilities, eye movement idiosyncrasies, etc. In other examples, HMD 12 may take other form factors, such as the general form factor of a headset or goggles equipped with a band to secure HMD 12 to the head of user 8.

In the example illustrated in FIG. 2, HMD 12 further includes one or more motion sensors 32, such as one or more accelerometers (also referred to as inertial measurement units or "IMUs") that output data indicative of current acceleration of HMD 12, GPS sensors that output data indicative of a location of HMD 12, radar, or sonar that output data indicative of distances of HMD 12 from various objects, or other sensors that provide indications of a location or orientation of HMD 12 or other objects within a physical environment. In the example illustrated in FIG. 2, HMD 12 includes integrated image capture devices 14A and 14B (collectively, "image capture devices 14"). Image capture devices 14 may include still image camera hardware, video camera hardware, laser scanners, Doppler® radar scanners, fundus photography hardware, infrared imaging cameras, depth scanners, or the like. Image capture devices 14 may include outward-facing and/or inward-facing image capture hardware, and include any hardware configured to capture image data representative of a surrounding physical environment, and optionally, to preprocess and/or post process the captured image data. Outward-facing camera hardware of image capture devices 14 may capture image data of the physical environment outside of HMD 12, such as, but not limited to, the real-world environment at which user 8 is positioned. Inward-facing camera hardware of image capture devices 14 may capture image data of wearer of HMD 12, such as facial images and/or retina scans and/or temperature information of user 8.

Again HMD 12 is in communication example peripheral device 6 in the example of FIG. 2. Peripheral device 6 may be communicatively coupled to HMD 12 in a number of ways, such as over a wireless communication links (e.g., Wi-Fi', near-field communication of short-range wireless communication such as Bluetooth®, etc.) or a wired communication link or tethered connection, or any combination thereof. Peripheral device 6 may receive and send data over network 18, and may thereby function as a network interface of the artificial reality system that includes or is formed by the combination peripheral device 6 with HMD 12. In various examples, HMD 12 may communicate via network 18 by way of direct or indirect links to an edge device of network 18. Surface 36 of peripheral device 6 represents an input component or a combined input/output component of peripheral device 6. Surface 36 may include sensing capabilities, such as those of a touchscreen (e.g., a capacitive touchscreen, resistive touchscreen, surface acoustic wave (SAW) touchscreen, infrared touchscreen, optical imaging touchscreen, acoustic pulse recognition touchscreen, or any other touchscreen), touchpad, buttons, trackball, scroll wheel, or other presence-sensitive hardware that uses capacitive, conductive, resistive, acoustic, or other technology to detect touch and/or hover input.

Surface 36 may enable peripheral device 6 to receive touch input or gesture input without direct contact with surface 36. User 8 may provide these touch or gesture inputs to peripheral device 6 to provide instructions directly to peripheral device 6, or indirectly to HMD 12 and/or other components of an artificial reality system in which HMD 12 is deployed. In some examples, processing circuitry of HMD 12 may utilize image capture devices 14 to analyze configurations, positions, movements, and/or orientations of peripheral device 6, of the hand(s) or digit(s) thereof of user 8 to enable to provide input using gestures such as drawing gestures or typing gestures provided via a graphical keyboard.

In this way, peripheral device 6 may offload various hardware and resource burdens from HMD 12, which enables low-profile form factor designs of HMD 12. Peripheral device 6 also serves as a communications intermediary between HMD 12 and devices at remote locations, via network 18. Additional details of peripheral device 6 are described in U.S. patent application Ser. No. 16/506,618 (filed on 9 Jul. 2019), the entire content of which is incorporated herein by reference. HMD 12 includes HMD SoC 2, and peripheral device 6 includes peripheral SoC 4. HMD SoC 2 and peripheral SoC 4 are communicatively coupled over the communicative connection between HMD 12 and peripheral device 6. The remainder of this disclosure describes the communications between HMD SoC 2 and peripheral SoC 4 as being performed over a wireless link between HMD 12 and peripheral device 6, although it will be understood that HMD 12 and peripheral device 6 may be coupled via other types of communicative connections, as well.

As described above with respect to FIGS. 1A and 1B, HMD SoC 2 and peripheral SoC 4 are configured to manage access to their respective SMEM units such that different subsystems are treated as mutually distrusting entities. That is, each of HMD SoC 2 and peripheral SoC 4 grant access to discrete address spaces of the respective SMEM unit only to a particular subsystem, and deny all other subsystems access to the particular subsystem's SMEM address space. According to configurations of this disclosure, HMD SoC 2 and peripheral SoC 4 communicate with one another by formatting data units in a way that thwarts various types of DMA attacks that attempt to breach cross-subsystem data secrecy within HMD SoC 2 and/or within peripheral SoC 4. Both HMD SoC 2 and peripheral SoC 4 are configured to implement one or more of the data communication techniques of this disclosure. Purely as an example for ease of discussion, however, FIG. 2 is described with respect to a crypto packet flow originated by a subsystem of HMD SoC 2, with a subsystem of peripheral SoC 4 being the destination of the crypto packet flow.

When generating crypto packets for a packet flow originating from a particular subsystem of HMD SoC 2, a DMA microcontroller (MCU) of HMD SoC 2 may format the encryption header of each crypto packet to include channel ID field. The DMA MCU of HMD SoC 2 populates the channel ID field with an unencrypted (or "plain text") representation of the channel ID of the packet. The channel ID is unique to the {source subsystem of HMD SoC 2, destination subsystem of peripheral SoC 4} tuple describing the traversal endpoints and traversal direction of the crypto packet. A security processor of HMD SoC 2 is configured according to this disclosure to select a unique key with which the AES engine of HMD SoC 2 encrypts the payload of the crypto packet, based on the plain-text channel ID field of the encryption header. As such, the security processor of HMD SoC 2 selects a unique AES key for encrypting crypto packet payloads are selected on a per-channel ID basis.

Upon receipt at peripheral SoC 4, the destination subsystem of peripheral SoC 4 parses the encryption header during decapsulation to obtain the channel ID information for the crypto packet. According to the techniques of this disclosure, the security processor of peripheral SoC 4 uses the channel ID to select the corresponding unique key with which to decrypt the encrypted payload of the decapsulated crypto packet. The payload can only be decrypted successfully if the AES engine of peripheral SoC 4 uses the correct decryption key corresponding to the channel ID of the received crypto packet. In turn, peripheral SoC 4 stores the decrypted payload to SMEM address space reserved for the particular subsystem specified in the destination portion of the channel ID parsed from the encryption header of the received crypto packet. In this way, HMD SoC 2 and peripheral SoC 4 are configured according to aspects of this disclosure to tunnel encrypted traffic on a per-subsystem basis, to prevent DMA attacks that might attempt to break the cross-subsystem data isolation of HMD SoC 2 and peripheral SoC 4, while maintaining multi-key encryption/decryption with respect to cross-SoC traffic.

In some implementations, HMD SoC 2 and peripheral SoC 4 are configured according to aspects of this disclosure to mitigate or prevent DMA loopback attacks. As described above, DMA loopback attacks short circuit traffic within HMD SoC 2 or within peripheral SoC 4. Described with respect to HMD SoC 2 as a non-limiting example, a DMA loopback attack may attempt to reroute traffic originating from a first subsystem of HMD SoC 2 to loop back to the SMEM of HMD SoC 2, to be stored in SMEM address space allocated to a second subsystem of the same SoC.

The AES engine of HMD SoC 2 is configured according to this disclosure to embed a 1-bit field in the encryption header of each packet to identify HMD SoC 2 as the source SoC, and to compute a cryptographic signature by applying the channel ID-selected cipher key to the plain-text source SoC-identifying bit and channel ID information in the encryption header. The AES engine of HMD SoC 2 signs the entire crypto packet (plain-text header and encrypted payload) using the cryptographic signature computed in this fashion. Upon receipt of the crypto packet, the AES engine of peripheral SoC 4 can extract the source SoC-identifying bit, and verify that the cryptographic signature is generated using both the correct source SoC-identifying bit (in this case, to identify HMD SoC 2 as the source) and the correct AES key (which the AES engine of peripheral SoC 4 can extrapolate based on the decryption key selected for decryption on the channel ID identified in the encryption header). For example, the AES engine of peripheral SoC 4 may verify that the cryptographic signature via comparison with an independently constructed signature formed using the source SoC-identifying bit and the channel ID reflected in the encryption header.

By cryptographically binding the source SoC (in this example, HMD SoC 2), the channel ID describing the traversal route of the crypto packet, and the channel ID-unique AES key to the entirety of a crypto packet using the cryptographic signature of this disclosure, the AES engine of HMD SoC 2 is configured according to aspects of this disclosure to enforce a strict traffic flow constraint on cross-SoC crypto packet flows. This strict traffic flow constraint enables the AES engine of the destination SoC (in this example, peripheral SoC 4) to drop malicious packets detected based on any mismatches in the cryptographic signature or its underlying input information, based on relatively simple comparison operations. HMD SoC 2 and peripheral SoC 4 implement the cryptographic binding operations of this disclosure using their respective AES engines, in order to move these functionalities away from DMA microcontroller unit that are often the targets of DMA loopback attacks. In this way, HMD SoC 2 and peripheral SoC 4 protect inter-SoC transports from being the subject of DMA loopback attacks, leveraging data that is inherent to each transport, and without introducing the need for additional hardware overhead.

Figure 3:
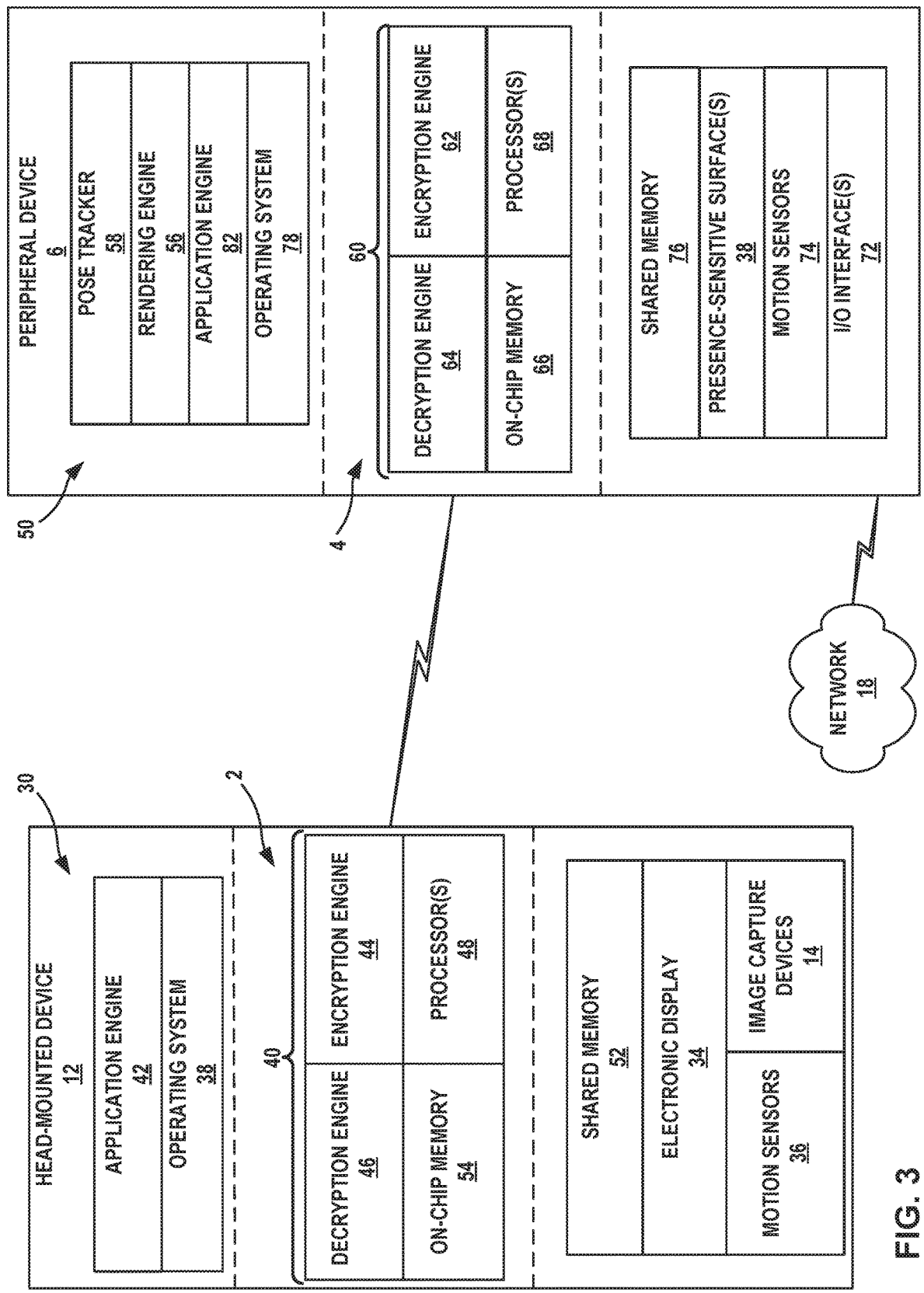
FIG. 3 is a block diagram showing example implementations of the HMD of FIG. 1A in communication with the peripheral device of FIG. 1A.

FIG. 3 is a block diagram showing example implementations of HMD 12 and peripheral device 6. In this example, HMD SoC 2 of HMD 12 includes one or more processors 48 and memory 52, in addition to encryption engine 44 and decryption engine 46. Encryption engine 44 and decryption engine 46 are referred to collectively as "AES engine 40" of HMD SoC 2, although it will be appreciated that encryption engine 44 and/or decryption engine 46 may implement encryption/decryption operations in accordance with standards other than the AES or in non-standard-compliant ways, in other examples within the scope of this disclosure.

Shared memory 52 and processor(s) 48 of HMD 12 may, in some examples, provide a computer platform for executing an operating system 38. Operating system 38 may represent an embedded, real-time multitasking operating system, for instance, or other type of operating system. In turn, operating system 38 provides a multitasking operating environment for executing one or more software components 30, including application engine 42.

Processor(s) 48 may be coupled to one or more of electronic display 34, motion sensors 36, and/or image capture devices 14. Processor(s) 48 are included in HMD SoC 2, which also includes on-chip memory 56. On-chip memory 54 is collocated with processor(s) 48 within a single integrated circuit denoted as HMD SoC 2 in the particular example shown in FIG. 3. Processor(s) 48 may use on-chip memory 54 as a temporary storage location for self-contained data processing performed within HMD SoC 2.

HMD 12 is communicatively coupled to peripheral device 6, as shown in FIG. 3. Peripheral device 6 and HMD 12 function in tandem as co-processing devices to deliver the artificial reality experiences to user 8 as described above with respect to FIGS. 1A-2. Peripheral device 6 may offload portions of the computing tasks otherwise performed by HMD 12, thereby enabling a reduced hardware infrastructure and therefore a lower-profile form factor with respect to the design of HMD 12.

Peripheral device 6 includes presence-sensitive surface 38 (described above with respect to FIG. 2), as well as input/output (I/O) interface(s) 72, and motion sensors 74. Peripheral device 6 may invoke I/O interface(s) 72 to send and receive data over network 18, such as cipher text or plain text (unencrypted) data. I/O interface(s) 72 may also incorporate hardware that enables peripheral device 6 to communicate wirelessly with HMD 12. Peripheral device 6 may invoke motion sensors 74 to detect and track motion by user 8 for use in computing updated pose information for a corresponding frame of reference of HMD 12.

Peripheral SoC 4 of peripheral device 6 includes encryption engine 62, decryption engine 64, on-chip memory 66, and one or more processors 68. On-chip memory 66 represents memory collocated with processor(s) 68 within a single integrated circuit denoted as peripheral SoC 4 in the particular example shown in FIG. 3. Processor(s) 68 may use on-chip memory 66 as a temporary storage location for self-contained data processing performed within peripheral SoC 4.

Encryption engine 62 and decryption engine 64 are referred to collectively as "AES engine 60" of peripheral SoC 4, although it will be appreciated that encryption engine 62 and/or decryption engine 64 may implement encryption/decryption operations in accordance with standards other than the AES or in non-standard-compliant ways, in other examples within the scope of this disclosure. Shared memory 76 and processor(s) 68 of peripheral device 6 provide a computer platform for executing an operating system 78. Operating system 78 may represent an embedded, real-time multitasking operating system, for instance, or other type of operating system. In turn, operating system 78 provides a multitasking operating environment for executing one or more software components 50.

Apart from operating system 78, software components 50 include an application engine 82, a rendering engine 56, and a pose tracker 58. In some examples, software components 50 may not include rendering engine 56, and HMD 12 may perform the rendering functionalities without co-processing with peripheral device 6. In general, application engine 82, when invoked, provides functionality to provide and present an artificial reality application, e.g., a teleconference application, a gaming application, a navigation application, an educational application, a training application, a simulation application, or the like, to user 8 via HMD 12. Application engine 82 may include, for example, one or more software packages, software libraries, hardware drivers, and/or Application Program Interfaces (APIs) for implementing an artificial reality application. Responsive to control by application engine 82, rendering engine 56 generates artificial reality content 22 (e.g., incorporating 3D artificial reality content) for display to user 8 by application engine 42 of HMD 12.

Application engine 82 and rendering engine 56 construct artificial reality content 22 for display to user 8 in accordance with current pose information for a frame of reference, typically a viewing perspective of HMD 12, as determined by pose tracker 58. Based on the current viewing perspective, rendering engine 56 constructs artificial reality content 22 (e.g., 3D artificial content) which may in some cases be overlaid, at least in part, upon the real-world 3D environment of user 8.

During this process, pose tracker 58 operates on sensed data received from HMD 12, such as movement information and user commands, and, in some examples, data from any external sensors 26 (shown in FIGS. 1A & 1B), to capture 3D information within the real-world environment, such as motion by user 8 and/or feature tracking information with respect to user 8. Based on the sensed data, pose tracker 58 determines a current pose for the frame of reference of HMD 12 and, in accordance with the current pose, constructs artificial reality content 22 for communication, via one or more I/O interfaces 72, to HMD 12 for display to user 8.

While HMD 12 and peripheral device 6 may communicate on a number of levels, FIG. 3 is primarily described with respect to communications at the level represented by HMD SoC 2 and peripheral SoC 4. Shared memory 52 includes the SMEM of HMD SoC 2, and shared memory 76 includes the SMEM of peripheral SoC 4. Similarly, processor(s) 48 include a security processor of HMD SoC 2, and processor(s) 68 include a security processor of peripheral SoC 4.

Processor(s) 48 and processor(s) 68 implement techniques of this disclosure to maintain cross-subsystem data isolation (or secrecy) in separate address spaces of shared memory 52 and shared memory 76, respectively. Processor(s) 48 and processor(s) 68 invoke encryption engines 44 and 62, respectively, to encrypt transmission (Tx) channel data, which represents outgoing data with a destination of the other SoC. In encapsulating crypto packets that include the encrypted data as payloads, processor(s) 48 and processor(s) 68 format the encryption header of each Tx channel crypto packet to include a channel ID field, which is unique to a {source subsystem, destination subsystem} tuple for the respective crypto packet.

Processor(s) 48 and processor(s) 68 are configured according to this disclosure to select cipher keys to be applied by encryption engines 44 and 62 based on the channel ID of the crypto packet that will be formed using the data under encryption. Upon receipt of a crypto packet, processor(s) 48 and processor(s) 68 may decapsulate the crypto packet, and as part of the decapsulation process, parse the encryption header to obtain the channel ID information for the crypto packet.

Based on the channel ID obtained from the parsed header, processor(s) 48 and processor(s) 68 may select the corresponding decryption keys to be applied by decryption engines 46 and decryption engine 64 to decrypt the decapsulated, encrypted payload. In this way, processor(s) 48 and processor(s) 68 implement the techniques of this disclosure to tunnel encrypted traffic on a per-subsystem basis, to prevent DMA attacks that might attempt to break the cross-subsystem data isolation within the SoC SMEMs of shared memory 52 and shared memory 76, while enabling AES engines 40 and 60 to maintain multi-key encryption and decryption with respect to transports communicated between HMD SoC 2 and peripheral SoC 4.

In some examples, processor(s) 48 and processor(s) 68 implement techniques of this disclosure mitigate or prevent DMA loopback attacks that attempt to short circuit traffic within either HMD SoC 2 or peripheral SoC 4 to reroute traffic originating from a first subsystem in the respective SoC to loop back to shared memory 52 or shared memory 76 (as the case may be), to be stored in address space reserved for a second subsystem of the same SoC. Each of AES engines 40 and 60 mitigates DMA loopback attacks using a multistage process. The multistage process is described herein as being performed by AES engine 40 as an example, although it will be appreciated that AES engine 60 may also be perform the DMA loopback attack-mitigation techniques of this disclosure.

To perform the DMA loopback attack-mitigating multistage process of this disclosure, AES engine 40 first embeds a 1-bit field in the encryption header of each crypto packet to identify HMD SoC 2 as the source SoC. Next, AES engine 40 computes a cryptographic signature by applying the encryption key selected (based on the channel ID of the crypto packet being formed) for the payload of the crypto packet to the source SoC-identifying bit and the channel ID information in the encryption header of the crypto packet. Finally, AES engine 40 signs the entire packet (plain text encryption header and encrypted payload) using the cryptographic signature formed in this way.

Upon receiving the crypto packet, AES engine 60 extracts the source SoC-identifying bit (to determine that HMD SoC 2 originated the crypto packet), and verifies that the cryptographic signature applied to the crypto packet was generated using both the correct source SoC-identifying bit and the correct AES key (the latter of which AES engine 60 can verify based on the channel ID obtained from the encryption header of the crypto packet). In this way, AES engine 40 cryptographically binds the identity of the source SoC (HMD SoC 2 in this case) and the subsystem-to-subsystem channel ID of the crypto packet to the entirety of the crypto packet, using the cryptographic signature of this disclosure.

AES engine 60 may also format and cryptographically sign outgoing crypto packets in a corresponding manner, with the source SoC-identifying bit being flipped. In one example, AES engine 40 may embed a '0' bit in the source SoC-identifying field to denote HMD SoC 2 as the source SoC and AES engine 60 may embed a '1' bit in the source SoC-identifying field to denote peripheral SoC 4 as the source SoC. In another example, AES engine 40 may embed a '1' bit in the source SoC-identifying field to denote HMD SoC 2 as the source SoC and AES engine 60 may embed a '0' bit in the source SoC-identifying field to denote peripheral SoC 4 as the source SoC. In this way, AES engines 40 and 60 implement certain techniques this disclosure to enforce strict traffic flow constraints that enables the receiving AES engine 40 or 60 to detect malicious packets based on signature mismatches, and to thereby quarantine or drop the malicious packets detected in this way, thus preventing a prohibited subsystem from accessing such a malicious packet from shared memory 52 or shared memory 76.

Each of processors 48 and 68 may comprise any one or more of a multi-core processor, a controller, a digital signal processor (DSP), an application specific integrated circuit (ASIC), a field-programmable gate array (FPGA), processing circuitry (e.g., fixed-function circuitry or programmable circuitry or any combination thereof) or equivalent discrete or integrated logic circuitry. Any one or more of shared memory 52, shared memory 76, on-chip memory 54, or on-chip memory 66 may comprise any form of memory for storing data and executable software instructions, such as random-access memory (RAM), read only memory (ROM), programmable read only memory (PROM), erasable programmable read only memory (EPROM), electronically erasable programmable read only memory (EEPROM), or flash memory.

Figure 4:
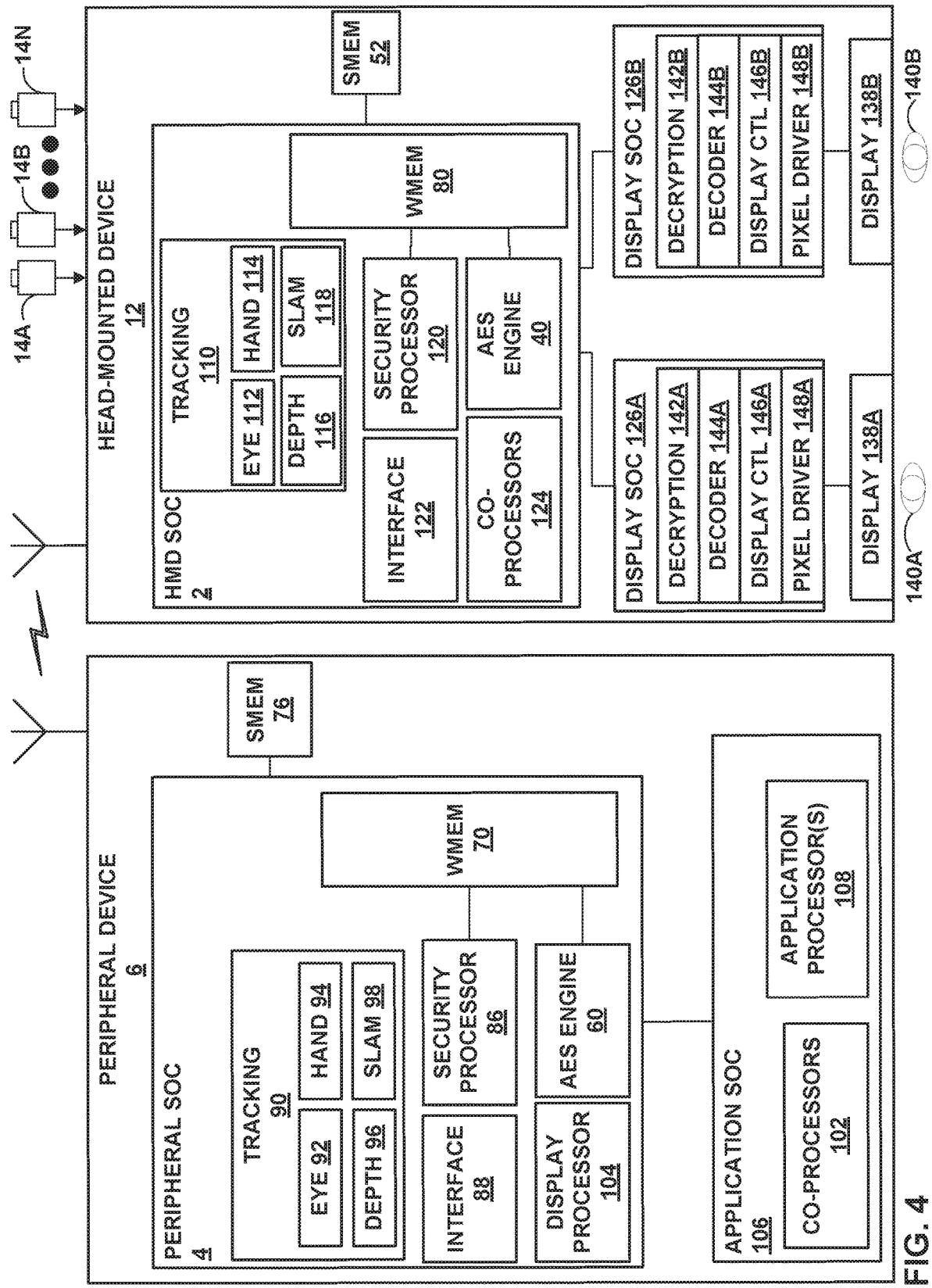
FIG. 4 is a block diagram illustrating a more detailed example implementation of a distributed architecture for the multi-device artificial reality systems of FIGS. 1A & 1B in which one or more devices are implemented using one or more system on a chip (SoC) integrated circuits within each device.

FIG. 4 is a block diagram illustrating a more detailed example implementation of a distributed architecture for a portion of multi-device artificial reality systems 10 and 20, in which two or more devices are implemented using respective SoC integrated circuits within each device. FIG. 4 illustrates an example in which HMD 12 operating in conjunction with peripheral device 6. Again, peripheral device 6 represents a physical, real-world device having a surface on which multi-device artificial reality systems 10 or 20 overlay virtual content. Peripheral device 6 includes one or more presence-sensitive surface(s) 38 for detecting user inputs by detecting a presence of one or more objects (e.g., fingers, stylus, etc.) touching or hovering over locations of presence-sensitive surfaces) 38.

In some examples, peripheral device 6 may have a form factor similar to any of a smartphone, a tablet computer, a personal digital assistant (PDA), or other hand-held device. In other examples, peripheral device 6 may have the form factor of a smartwatch, a so-called "smart ring," or other wearable device. Peripheral device 6 may also be part of a kiosk or other stationary or mobile system. Presence-sensitive surface(s) 38 may incorporate output components, such as display device(s) for outputting visual content to a screen. As described above, HMD 12 is architected and configured to enable the execution of artificial reality applications.

Each of HMD SoC 2, peripheral SoC 4, and the other SoCs illustrated in FIG. 4 represent specialized integrated circuits arranged in a distributed architecture, where each SoC integrated circuit includes various specialized functional blocks configured to provide an operating environment for artificial reality applications. FIG. 4 is merely one example arrangement of SoC integrated circuits that peripheral device 6 and HMD 12. The distributed architecture for multi-device artificial reality systems 10 and 20 may include any collection and/or arrangement of SoC integrated circuits.

In the example of FIG. 4, HMD SoC 2 of HMD 12 comprises functional blocks including tracking 110, security processor 120, interface 122, co-processors 124, and AES engine 40. AES engine 40 include encryption engine 44 and decryption engine 46 implemented separately in silicon. Tracking 110 provides a functional block for eye tracking 112 ("eye 112"), hand tracking 114 ("hand 114"), depth tracking 116 ("depth 116"), and/or Simultaneous Localization and Mapping (SLAM) 118 ("SLAM 118").

For example, HMD 12 may receive input from one or more accelerometers (e.g., quantities represented in inertial measurement units or "IMUs") that output data indicative of current acceleration of HMD 12, GPS sensors that output data indicative of a location of HMD 12, radar or sonar that output data indicative of distances of HMD 12 from various objects, or other sensors that provide indications of a location or orientation of HMD 12 or other objects within a physical environment. HMD 12 may also receive image data from one or more image capture devices 14A-14N (collectively, "image capture devices 14").

Image capture devices 14 may include various inward-facing and/or outward-facing image capture hardware, including one or more of still cameras, video cameras, laser scanners, Doppler® radar scanners, fundal photography hardware, infrared imaging hardware depth scanners, or the like, configured to output image data representative of the physical environment. Image capture devices 14 capture image data representative of objects (including peripheral device 6 and/or hand and/or the eyes of user 8) in the physical environment that are within a field of view of image capture devices, which typically corresponds with the viewing perspective of HMD 12 or the inward-facing view of HMD 12. Based on a portion of the sensed data and/or a portion of the image data, tracking 110 determines, for example, a current pose for the frame of reference of HMD 12 and, in accordance with the current pose, renders the artificial reality content. AES engine 40 is a functional block configured to encrypt Tx channel data communicated to peripheral device 6 and to decrypt Rx channel data communicated from peripheral device 6 or other system.

Application co-processors 124 include various processors such as a video processing unit, graphics processing unit (GPU), digital signal processors (DSPs), encoders and/or decoders, and/or others. In accordance with the techniques described in this disclosure, all or portions of a backend shell may be in hardware, software, or a combination of hardware and software. For example, the backend shell of a concurrent application engine may be executed on co-application processors 124. A plurality of artificial reality applications may be concurrently executed on co-application processors 124, in some examples.

Display SoCs 126A and 126B each represent display controllers for outputting artificial reality content on respective displays, e.g., displays 138A, 138B (collectively, "displays 138"). In this example, display SoC 126A may include a display controller for display 138A to output artificial reality content for a left eye 140A of user 8. In the example of FIG. 4, display SoC 126A includes a decryption block 142A, a decoder block 144A, a display controller 146A, and a pixel driver 148A for outputting artificial reality content on display 138A. Similarly, display SoC 126B includes a display controller for display 138B to output artificial reality content for a right eye 140B of user 8. In the example of FIG. 4, display SoC 126B includes a decryption unit 142B, a decoder 144B, a display controller 146B, and/or a pixel driver 148B for generating and outputting artificial reality content on display 138B. Displays 138 may include any one or more of light-emitting diode (LED) displays, organic LEDs (OLEDs), quantum dot LEDs (QLEDs), electronic paper (E-ink) displays, liquid crystal displays (LCDs), or other types of displays for displaying digital content, such as artificial reality content 22.

Peripheral device 6 includes peripheral SoC 4 and application SoC 106 configured to support an artificial reality application. In this example, peripheral SoC 4 comprises functional blocks including AES engine 40, interface 88, tracking 90, security processor 86, and display processor 104. Tracking 90 is a functional block providing eye tracking 92 ("eye 92"), hand tracking 94 ("hand 94"), depth tracking 96 ("depth 96"), and/or simultaneous localization and mapping (SLAM) 98 ("SLAM 98").

For example, peripheral device 6 may receive input from one or more accelerometers (quantified in IMUs) that output data indicative of current acceleration of peripheral device 6, GPS sensors that output data indicative of a location of peripheral device 6, radar or sonar that output data indicative of distances of peripheral device 6 from various objects, or other sensors that provide indications of a location or orientation of peripheral device 6 or other objects within a physical environment. Peripheral device 6 may in some examples also receive image data from one or more image capture devices, such as still cameras, video cameras, laser scanners, Doppler® radar scanners, depth scanners, or the like, configured to output image data representative of the physical environment. Based on the sensed data and/or image data, tracking block 90 determines, for example, a current pose for the frame of reference of peripheral device 6 and, in accordance with the current pose, renders the artificial reality content to HMD 12.

AES engine 60 includes encryption engine 62 and decryption engine 64, implemented separately in silicon. As such, AES engine 60 is a functional block configured to encrypt Tx channel data communicated to HMD 12 and to decrypt Rx channel data communicated from HMD 12. In various examples, AES engine 60 may support symmetric key cryptography to encrypt/decrypt data using a session key (e.g., a secret symmetric key). Display processor 104 includes one or more processors such as a video processing unit, graphics processing unit, encoders and/or decoders, and/or others, for rendering artificial reality content to HMD 12.

Interface 88 includes one or more interfaces for connecting to functional blocks of HMD SoC 4. As one example, interface 88 may include peripheral component interconnect express (PCIe) slots. HMD SoC 4 may connect with application SoC 106 using interface 88. HMD SoC 4 may connect with one or more communication devices (e.g., radio transmitter) using interface 88 for communicating with other devices, such as HMD 12. Security processor 86 provides secure device attestation and mutual authentication of when pairing peripheral device 6 with devices, e.g., HMD 12, used in conjunction within the AR environment. Security processor 86 may authenticate application SoC 106 of peripheral device 6.

Application SoC 106 includes application co-processors 102 and application processors 108. In this example, co-application processors 102 includes various processors, such as a vision processing unit (VPU), a graphics processing unit (GPU), and/or central processing unit (CPU). Application processors 108 may include a processing unit for executing one or more artificial reality applications to generate and render, for example, a virtual user interface to a surface of peripheral device 6 and/or to detect gestures performed by a user with respect to peripheral device 6.

Peripheral SoC 4 includes wireless memory (WMEM) 70, which represents a portion of or the entirety of on-chip memory 66. HMD SoC 2 includes WMEM 80, which represents a portion of or the entirety of on-chip memory 54. Each of peripheral SoC 4 and HMD SoC 2 may support multiple subsystems of peripheral device 6 and HMD 12, respectively. Peripheral SoC 4 may load data (for any subsystem) to WMEM 70 on a temporary basis, to enable further on-chip processing of the data by AES engine 60 or other components of peripheral SoC 4. Similarly, HMD SoC 2 may load data (for any subsystem) to WMEM 80 on a temporary basis, to enable further on-chip processing of the data by AES engine 40 or other components of HMD SoC 2.

Security processors 86 and 120 are configured to prevent DMA attacks, and in some cases, DMA loopback attacks, according to aspects of this disclosure. Security processors 86 and 120 select unique keys to be applied by AES engines 60 and 40, respectively, based on the channel ID that describes the {source subsystem, destination subsystem} tuple for cross-SoC crypto packet traffic flowing between peripheral SoC 4 and HMD SoC 2, thereby applying a different key for every channel. Security processors 86 and 120 embed the channel ID pertaining to an encrypted payload of Tx traffic in the encryption header of the crypto packet, in plain text format.

Upon receiving cross-SoC crypto packets of Rx traffic, security processors 86 and 120 may parse the encapsulated encryption header to obtain the channel ID information for a particular transport. In turn, security processors 86 and 120 may select the corresponding unique key with which AES engines 60 and 40 are to decrypt the encrypted payload obtained from the received crypto packet. In this way, the techniques of this disclosure tunnel encrypted traffic on a per-subsystem basis, to prevent DMA attacks that might attempt to break the cross-subsystem data isolation within individual SoCs, while maintaining multi-key encryption/decryption with respect to cross-SoC traffic.

To prevent DMA loopback attacks, AES engines 40 and 60 implement the multistage process described above to cryptographically sign entire crypto packets of Tx traffic, thereby binding the identity of the source SoC (in this case, either HMD SoC 2 or peripheral SoC 4), the channel ID of the crypto packet, and the cipher key selected on a channel ID-unique basis, to the respective crypto packet. In turn, upon receiving, as part of Rx traffic, a crypto packet that is cryptographically signed in this way, AES engines 40 and 60 may verify the authenticity of the crypto packet using the cryptographic signature. If AES engine 40 or AES engine 60 detects a signature mismatch with respect to crypto packet received in Rx traffic, the receiving AES engine 40 or AES engine 60 may discard and not store the malicious packet to (respectively) shared memory 52 or 76, thereby preventing a breach of the cross-subsystem access restrictions implemented with respect to shared memory 52 and shared memory 76.

Figure 5:
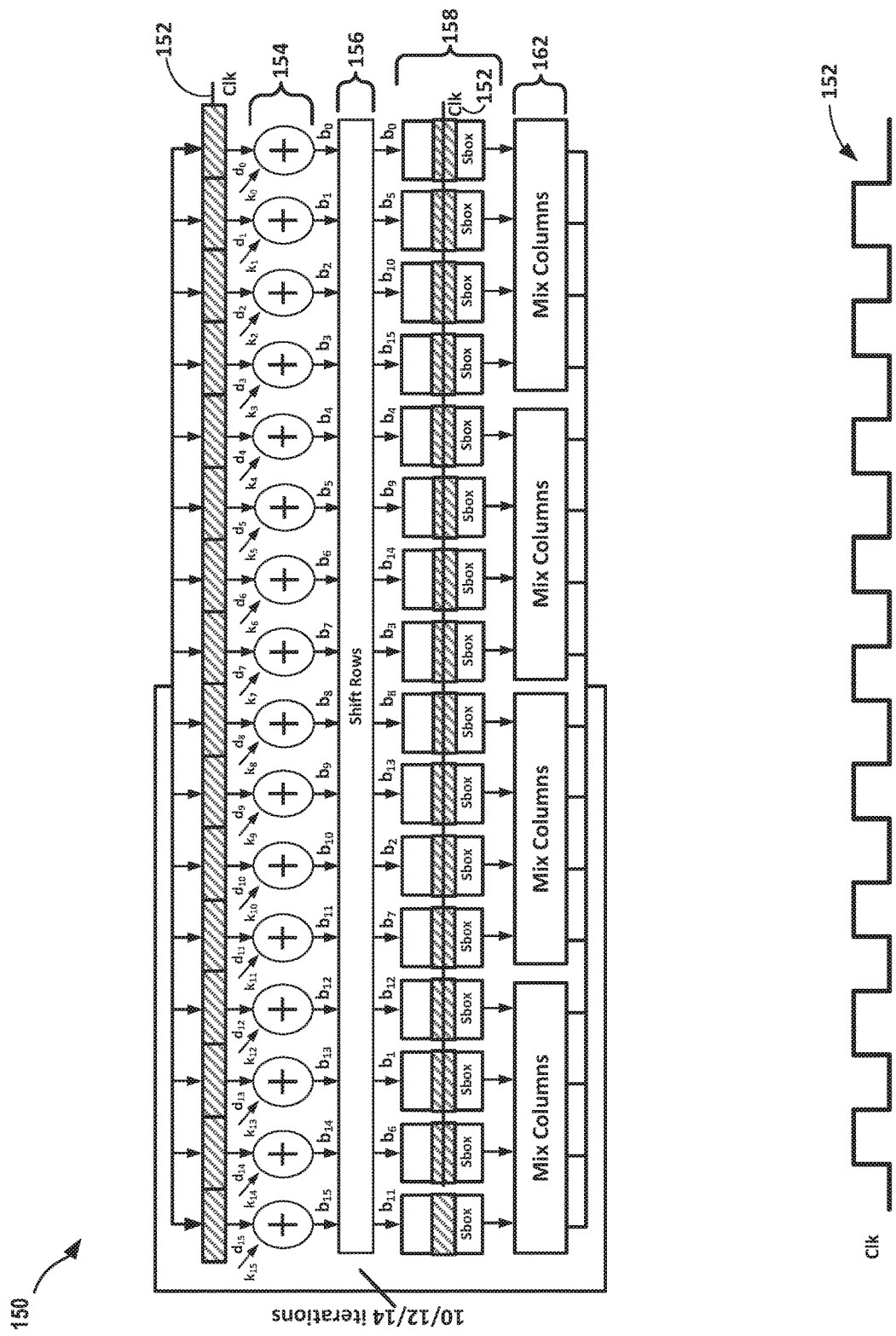
FIG. 5 is a conceptual diagram illustrating an example of AES-compliant encryption or decryption datapath.

FIG. 5 is a conceptual diagram illustrating an example of an AES-compliant encryption or decryption datapath. The process and structure illustrated in FIG. 5 is referred to herein as AES round datapath 150. An AES-compliant decryption engine may implement AES round datapath 150 to decrypt an input block of cipher text, by performing inverse operations with respect to a reciprocal encryption datapath that generates cipher text from unencrypted input data. Various aspects of AES round datapath 150 operate according to master clock 152. The clock rate of master clock 152 is described as being at a "full frequency" in the implementation illustrated in FIG. 5 to provide maximum decryption throughput with respect to decryption datapath 150. According to AES round datapath 150, a 16-byte (128-bit) encrypted input is provided, on a per-byte basis, to sixteen adder units as part of "add round key" step 154. In add round key step 154, each byte of the data input is added to a decryption key obtained using Rijndael's key schedule. Each input byte-key pair is shown in FIG. 5 using a "d-k" notation, using subscripts to delineate the different input bytes and the different decryption keys.

The sixteen output bytes (denoted using a "b" notation with unique subscripts) of add round key step 154 are then shifted cyclically by various offsets in a shift rows step 156. The shift rows step 156 cyclically shifts the bytes in each row by a certain offset determined for that particular row. In the shift rows step 156, the first row is left unchanged, each byte of the second row is right-shifted by an offset of one, each byte of the third row is right-shifted by an offset of two, and each byte of the fourth row is right-shifted by an offset of three. Thus, each column of the output data from shift rows step 156 includes shifted data from a column of the input data. The right-shifting operations described with respect to shift rows step 156 are generally reciprocal to left-shifting operations that are performed by a reciprocal AES-compliant encryption datapath.

The structure of the data output by the shift rows step 156 does not permit for independently operating on separate segments of the original 16-byte input, because data produced from four different block ciphers may be included in each four-byte run of the data output by the shift rows step 156. The shift rows step 156 is an iterative process that is performed in multiple passes, which, in the particular example of FIG. 5, is a ten-iteration step.

Each respective output byte of the shift rows step 156 is then passed through a respective inverse substitute byte (inverse Sbox) unit as part of inverse byte substitution computational stage 158. Decryption datapath 150 implements inverse byte substitution computational stage 158 by inverting a lookup table (LUT)-based substitution as a deciphering operation performed on the encrypted input data. In the reciprocal byte substitution step of an encryption datapath, each byte in the array output by a shift rows step is replaced with a substitute byte obtained using a LUT, which is also sometimes referred to as an 8-bit substitution box. Inverse byte substitution computational stage 158 addresses non-linearity in the cipher code received as input for AES round datapath 150.

The byte-substituted outputs of the sixteen inverse Sbox units are then provided to an array of mix columns units for performance of mix columns step 162. AES round datapath 150 includes four mix columns units, each of which receives, as input, the outputs of four contiguous inverse Sbox units. As such, each mix columns unit processes a four-byte input as part of mix columns step 162. In mix columns step 162, each mix columns unit combines the respective four-byte input using an invertible linear transformation. Each mix columns unit receives a four-byte input, and produces a four-byte output. Each four-byte input received by a respective mix columns unit is sometimes referred to as a respective "column" in the context of during mix columns step 162. Each mix columns unit of AES round datapath 150 processes the respective input column using matrix multiplication such that every single input byte affects all four output bytes. In a reciprocal encryption process, the combination of the reciprocal shift rows step and mix columns step provides diffusion in the cipher operation set.

An encryption datapath corresponding to decryption datapath 150 accepts a 16-byte (128-bit) block of unencrypted data, and adds cipher key segments (the cipher key being obtained using Rijndael's key schedule) to the unencrypted input, on a byte-by-byte basis during the corresponding "add round key" step. In a corresponding Sbox stage, the encryption datapath employs Sbox units, instead of inverse Sbox units described with respect to the decryption operations of AES round datapath 150. Purely for the sake of brevity, a separate AES encryption datapath is not illustrated in the accompanying drawings, in light of the structural parallels between the AES-compliant encryption datapath and the decryption-based AES round datapath 150 of FIG. 5.

Figure 6:
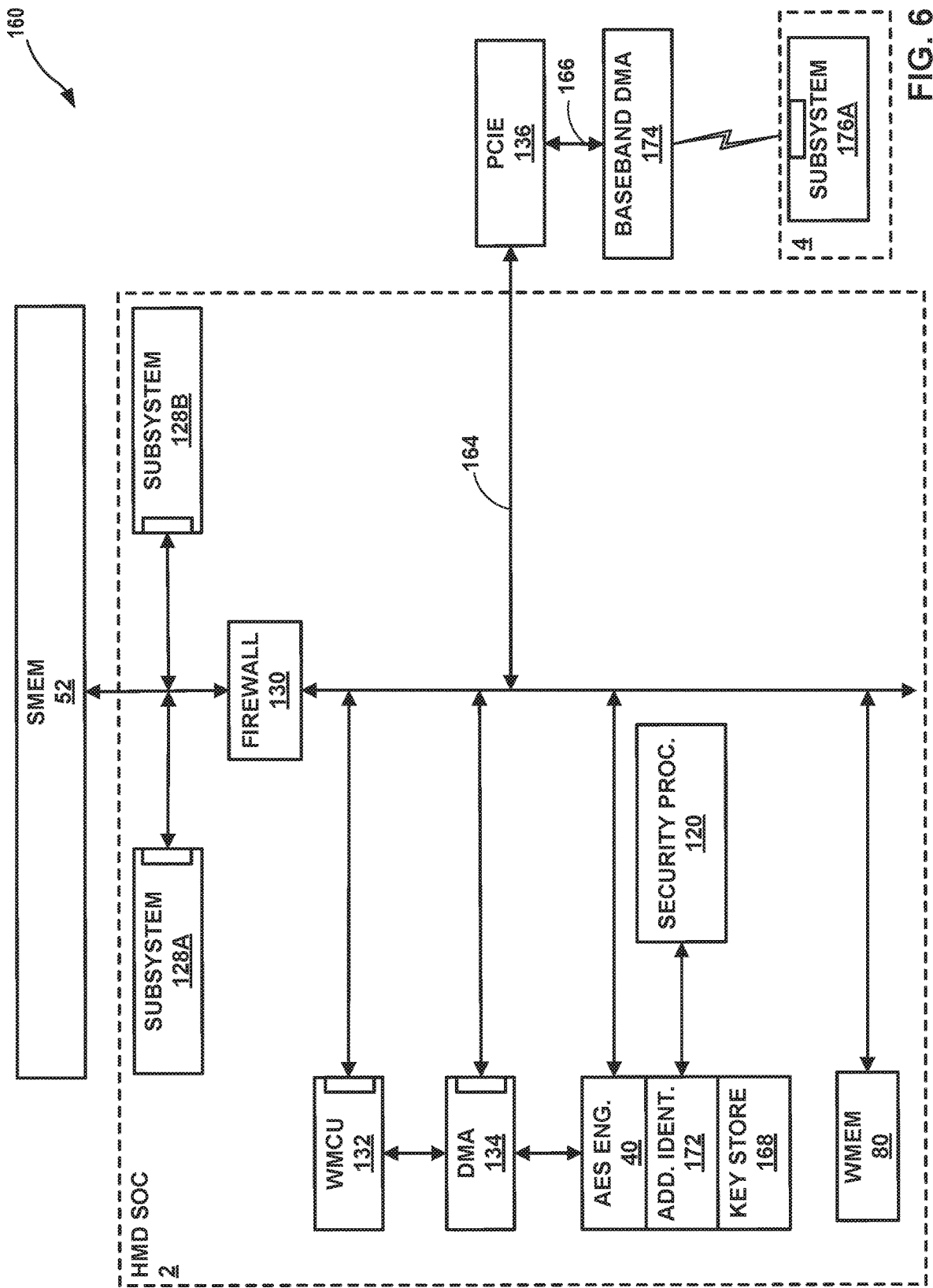
FIG. 6 is a block diagram illustrating a system that represents aspects of the HMD of FIG. 1A that are communicatively coupled to portions of the peripheral device of FIG. 1A.

FIG. 6 is a block diagram illustrating system 160 that represents aspects of HMD 12 that are communicatively coupled to portions of peripheral device 6. System 160 includes HMD SoC 2 and shared memory 52 (or "SMEM 52" as described with respect to FIG. 6). In the example shown in FIG. 6, HMD SoC 2 includes subsystems 128A and 128B (collectively, "subsystems 128"). While the example of FIG. 6 shows two subsystems included in HMD SoC 2, it will be appreciated that HMD SoC 2 may include a greater number of subsystems than two in other examples in accordance with aspects of this disclosure.

HMD SoC 2 also includes firewall 130, a wireless microcontroller unit (WMCU) 132 and a direct memory access (DMA) unit 134, in addition to AES engine 40, WMEM 80, and security processor 120, also shown in FIG. 4. HMD SoC also includes an address identifier unit 172, and a key store 168. The above-listed components of HMD SoC 2 are coupled via a shared bus 164 to PCIe interface 136. The overall connection fabric within HMD SoC 2 by which the various components connect, directly or indirectly, to shared bus 164 may incorporate network on chip (NoC) connectivity, another shared bus, hierarchical interconnect fabrics, and/or other types of connectivity. PCIe interface 136 is coupled to baseband DMA unit 174 via PCIe bus 166. Although the example implementation shown in FIG. 6 incorporates PCIe bus 166 and PCIe interface 136, HMD SoC 2 may incorporate other types of connectivity infrastructure in other examples consistent with this disclosure, such as universal serial bus (USB™) connectivity, peripheral component interconnect (PCI) connectivity, or numerous other types. With respect to crypto packets that are transmitted to peripheral SoC 4, PCIe interface 136 represents an egress interface from HMD SoC 2. With respect to crypto packets that are received from peripheral SoC 4, PCIe interface 136 represents an ingress interface to HMD SoC 2.

In general, HMD SoC 2 uses WMEM 80 to hold data on a short-term basis before being communicated to components outside of HMD SoC 2. In general, WMEM 80 holds encrypted data. With respect to Tx traffic, DMA unit 134 invokes AES engine 40 to encrypt data, and stores the encrypted data to WMEM 80 prior to egress. With respect to Rx traffic, DMA unit 134 decapsulates crypto packets after ingress, and stores the encrypted payload data to WMEM 80 prior to further processing.

When processing Tx traffic, DMA unit 134 obtains data from SMEM 52, and invokes AES engine 40 to encrypt the data inline as the data traverses the connection fabric of HMD SoC 2. DMA unit 134 stores the encrypted data to WMEM 80. In turn, security processor 120 encapsulates the encrypted data with a plain-text header (the "encryption header" described above) to form a crypto packet. DMA unit 134 causes the crypto packet to egress from HMD SoC 2 by loading the crypto packet to PCIe interface 136. In turn, baseband DMA unit 174, which is external to HMD SoC 2, transmits the crypto packet to an SoC housed in a remote device coupled to HMD 12. For example, baseband DMA unit 174 may use a wireless chip of HMD 12 to transmit the crypto packet to peripheral SoC 4 of peripheral device 6.

When processing Rx traffic, DMA unit 134 obtains a crypto packet from PCIe interface 136 which, in turn, may receive the crypto packet from baseband DMA unit 174. For example, the received crypto packet may be part of Rx traffic received from peripheral SoC 4 of peripheral device 6. Security processor 120 may decapsulate the crypto packet, and DMA unit 134 may store the decapsulated encrypted payload to WMEM 80. In turn, DMA unit 134 may invoke AES engine 40 to decrypt the data inline as the data traverses the connection fabric of HMD SoC 2, and store the decrypted data to SMEM 52.

Subsystems 128 are configured to be mutually distrusting with respect to accessing data from SMEM 52. That is, access privileges are partitioned with respect to SMEM 52. Subsystem 128A is prohibited from accessing the address space of SMEM 52 that is allocated to subsystem 128B, and 128B is prohibited from accessing the address space of SMEM 52 that is allocated to subsystem 128A. However, DMA attacks and DMA loopback attacks may attempt to corrupt the cross-partition data secrecy of SMEM 52 using spoofing or other techniques that create spurious data transports.

For example, a DMA attack may target Rx traffic originated by subsystem 176A of peripheral SoC 4, with a destination of subsystem 128A. The DMA attack may corrupt a crypto packet of this Rx traffic flow, such that DMA unit 134 routes the decrypted payload of the received crypto packet to address space of SMEM 52 reserved for subsystem 128B. If the DMA attack described in this scenario is successful, then subsystem 128B would have read access (and potentially, write privileges) with respect to data meant to be accessed only by subsystem 128A, thereby breaching the cross-partition data access restrictions in place with respect to SMEM 52.

HMD SoC 2 and peripheral SoC 4 are configured to prevent DMA attacks by enforcing a subsystem-to-subsystem traffic flow constraint to Tx crypto packets. The DMA attack-preventive techniques of this disclosure are described with respect to components of HMD SoC 2, although it will be understood that corresponding components of peripheral SoC 4 are configured to perform similar DMA attack-preventive techniques as well. Security processor 120, which represents a "roots of trust" or "RoT" component of HMD SoC 2, uses data available from address identifier unit 172 to form a channel ID for data that is loaded, in encrypted form, to WMEM 80.

As DMA unit 134 loads data from SMEM 52 to WMEM 80, DMA unit 134 invokes AES engine 40 to encrypt the data inline before loading the data to WMEM 80. Security processor 120 implements the techniques of this disclosure to determine the channel ID, which describes the traversal endpoints, at subsystem-level granularity, of the data that is to undergo encryption before being loaded to WMEM 80. Based on the channel ID determined for the data obtained by DMA unit 134, security processor 120 selects a cipher key from key store 168. Security processor 120 is configured according to aspects of this disclosure to select a unique cipher key for each channel ID. In turn, security processor 120 may cause AES engine 40 to encrypt the data using the unique channel ID-selected cipher key. DMA unit 134 may load the encrypted data to WMEM 80. In this way, security processor 120 enables AES engine 40 to perform multi-key encryption on a channel ID-unique basis.

In one example, security processor 120 may determine that the encrypted data is an encrypted form of raw data that DMA unit 134 obtained from the address space of SMEM 52 that is allocated to subsystem 128A. In this example, security processor 120 may determine that the destination of the crypto packet that will carry the encrypted data is subsystem 176A of peripheral SoC 4. Based on the information obtained from address identifier unit 172, security processor 120 forms a channel ID in which the {source subsystem, destination subsystem} tuple is {subsystem 128A, subsystem 176A}.

As part of the encapsulation process for the encrypted data, security processor 120 may form an encryption header for the crypto packet being formed to eventually carry the encrypted data as a payload. According to the techniques of this disclosure, security processor 120 may embed the channel ID in the encryption header, in plain text format. That is, security processor 120 implements the techniques of this disclosure to add a channel ID field to the encryption header of Tx traffic crypto packets, and to populate the channel ID field with a plain-text representation of the channel ID describing the traversal endpoints, at subsystem-level granularity. By binding the subsystem-level channel ID to each crypto packet in this way, security processor 120 implements the techniques of this disclosure to enable the receiving SoC (peripheral SoC 4 in this example) to select the channel ID-unique key for accurate decryption, and to route the decrypted payload data to the correct address space of shared memory ("SMEM") 76, thereby avoiding cross-subsystem data contamination that might occur as a result of DMA attacks.

Security processor 120 also performs an additional layer of encapsulation, in accordance with aspects of this disclosure. That is, security processor 120 may add an additional header outside the encryption header, to make the encryption header itself protocol agnostic. In the particular example of FIG. 6, security processor 120 may encapsulate the encrypted payload and the encryption header within a PCIe header, thereby configuring the resulting package to be a PCIe transport. In other examples, security processor 120 may encapsulate the encrypted payload and encryption header in different types of protocol-specific headers, depending on the protocol to which the egress interface conforms (e.g., USB™, conventional PCI, etc.). In this way, security processor 120 formats Tx crypto packets such that the encryption header (which includes the channel ID according to the configurations of this disclosure) itself is treated as payload information by a receiving interface, thereby making the encryption header a protocol-agnostic dataset.

Peripheral SoC 4 is configured to format Tx traffic in a corresponding way to that described above with respect to HMD SoC 2. Components of HMD SoC 2 shown in FIG. 6 may perform Rx-side (e.g. decapsulation, decryption, and storage) techniques of this disclosure to support multi-key decryption while preserving the access partition between subsystems 128A and 128 with respect to SMEM 52. After a crypto packet is received at HMD SoC 2 via PCIe interface 136, security processor 120 may decapsulate the crypto packet, and store the encrypted data of the payload to WMEM 80. Security processor 120 may parse the encryption header that was removed during decapsulation to obtain the channel ID information of the crypto packet.

In turn, security processor 120 may invoke address identifier unit 172 to match the obtained channel ID information to a corresponding decryption key available from key store 168. Again, address identifier unit 172 may map the channel IDs to decryption keys on a one-to-one basis, thereby supporting the channel ID-unique decryption key selection of this disclosure. Security processor 120 may load the channel ID-selected decryption key to AES engine 40. AES engine 40 may use the decryption key to decrypt the cipher text inline when DMA unit 134 moves the cipher text from WMEM 80 to SMEM 52.

Additionally, DMA unit 134 may use the destination subsystem designation provided in the channel ID to select an address space of SMEM 52 to which to store the decrypted data formed by AES engine 40 using the decryption key. In one example, the channel ID parsed by security processor 120 designates subsystem 128A as the destination subsystem of the data communicated in the Rx crypto packet. In this example, DMA unit 134 stores the plain-text data (formed via the decryption performed by AES engine 40 inline as part of the data loading process) to the address space of SMEM 52 that is reserved for subsystem 128A.

In this way, components of HMD SoC 2 perform Rx-side functionalities of this disclosure to leverage channel ID information available from the encryption header of an Rx crypto packet to support multi-key decryption while maintaining the cross-subsystem data secrecy enforced across partitions of SMEM 52. Moreover, as described with respect to the combination of the Tx-side and Rx-side techniques of this disclosure, HMD SoC 2 and peripheral SoC 4 tunnel encrypted traffic on a per-subsystem basis, to prevent DMA attacks that might attempt to break the cross-subsystem data isolation enforced with respect to SMEM 52 and SMEM 76, while maintaining multi-key encryption/decryption with respect to the cross-SoC traffic.

HMD SoC 2 and peripheral SoC 4 implement the channel ID-based techniques described thus far with respect to FIG. 6 to prevent DMA attacks in scenarios in which cross-SoC traffic successfully traverses between HMD SoC 2 and peripheral SoC 4. HMD SoC 2 and peripheral SoC 4 may also implement various techniques of this disclosure to prevent DMA loopback attacks. DMA loopback attacks trap Tx traffic within the source SoC and short circuit the Tx traffic by decrypting the payloads and rerouting the decrypted data to an SMEM address space of a subsystem that did not originate the data, thereby breaching the cross-subsystem data isolation configuration of the SMEM. The DMA loopback attack-preventive techniques of this disclosure are described with respect to HMD SoC 2, although it will be appreciated that peripheral SoC 4 is also configured similarly to prevent DMA loopback attacks.

DMA loopback attacks leverage the unavailability of destination subsystem-identifying information in the encrypted data stored to an SoC WMEM at any given time. Because the encrypted data stored to an SoC WMEM at any given time has either been decapsulated from a Tx crypto packet or is awaiting encapsulation to form an Rx crypto packet, the WMEM does not store traversal path (e.g., header) information for the encrypted data. Described with respect to FIG. 6, a DMA loopback attack may utilize data that DMA unit 134 loaded from SMEM 52 address space reserved for subsystem 128A to WMEM 80.

The DMA loopback attack may surreptitiously reconfigure WMCU 132 to cause DMA unit 134 to decrypt the data using AES engine 40 and route the resulting raw data to address space of SMEM 52 that is reserved for subsystem 128B. That is, the DMA loopback attack attempts to use Tx traffic originating from subsystem 128A to spoof Rx traffic destined for subsystem 128B, to compromise the mutual distrust between subsystems 128A and 128B with respect to access to SMEM 52.

Components of HMD SoC 2 are configured to prevent DMA loopback attacks by modifying the encryption header of Tx crypto packets and by cryptographically signing Tx crypto packets. Security processor 120 is configured to prevent loopback attacks using a multistage process. As part of encapsulating Tx crypto packets, security processor 120 embeds a 1-bit field in the encryption header of each Tx crypto packet to identify HMD SoC 2 as the source SoC. Additionally, security processor 120 invokes AES engine 40 to compute a cryptographic signature using the cipher key selected from key store 168 based on channel ID-matching performed by address identifier unit 172. For example, AES engine 40 may apply the channel ID-specific cipher key to the source SoC-identifying bit and the channel ID information that security processor 120 embeds in the encryption header. In turn, security engine 120 signs the entire crypto packet (plain-text encryption header and encrypted payload) using the cryptographic signature.

In this way, HMD SoC 2 enables components of a receiving SoC (peripheral SoC 4 in this example) to extract the source SoC-identifying bit, to verify that the received crypto packet is, in fact, an Rx crypto packet that originated from an external SoC (HMD SoC 2 in this example). Additionally, peripheral SoC 4 may verify that the cryptographic signature is generated using the correct combination of the source SoC-identifying bit, the correct channel ID, and the correct cipher key selected uniquely based on the channel ID. For example, peripheral SoC 4 may extract the source SoC identifier and the channel ID from the encryption header, and may extrapolate the cipher key that was applied based on the decryption key selected to decrypt the data at peripheral SoC 4. Peripheral SoC may verify whether the cryptographic signature matches a signature that is formed by applying the extrapolated cipher key to the correct source SoC identifier and the channel ID.

By cryptographically binding the identity of the source SoC, the channel ID, and the channel ID-selected cipher key to each Tx crypto packet using the modified encryption header and the cryptographic signature of this disclosure, HMD SoC 2 enforces a strict traffic flow constraint that enables peripheral SoC 4 to drop malicious packets detected based on a signature mismatch. That is, HMD SoC 2 provides data in each crypto header that peripheral SoC 4 can use to verify the cryptographic signature applied to the entire crypto packet, and vice versa. HMD SoC 2 and peripheral SoC 4 may thereby discard any data that is identified as potentially malicious (via loopback attack) before the data contaminates a prohibited partition in SMEM 52 or SMEM 76, as the case may be.

Additionally, security processor 120 implements the cryptographic binding operations of this disclosure in conjunction with AES engine 40. In this manner, the DMA loopback attack-preventive functionalities of this disclosure are moved away from DMA unit 134 and WMCU 132, which would be the components of HMD SoC 2 targeted and potentially breached in many DMA loopback attack scenarios. According to some more some granular implementations of the DMA loopback attack-preventive techniques of this disclosure, security processor 120 may embed a 4-bit sequence or 5-bit sequence in the encryption header to identify not only the source SoC, but also the particular subsystem within the source SoC that originated the traffic. In the example of FIG. 6, security processor 120 may implement the granular techniques of this disclosure to embed a 4-bit sequence or 5-bit sequence in the encryption header of each Tx crypto packet to identify HMD SoC 2 as the source SoC and one of subsystems 128A or 128B as the originating subsystem of the payload data of the Tx crypto packet.

Figure 7:
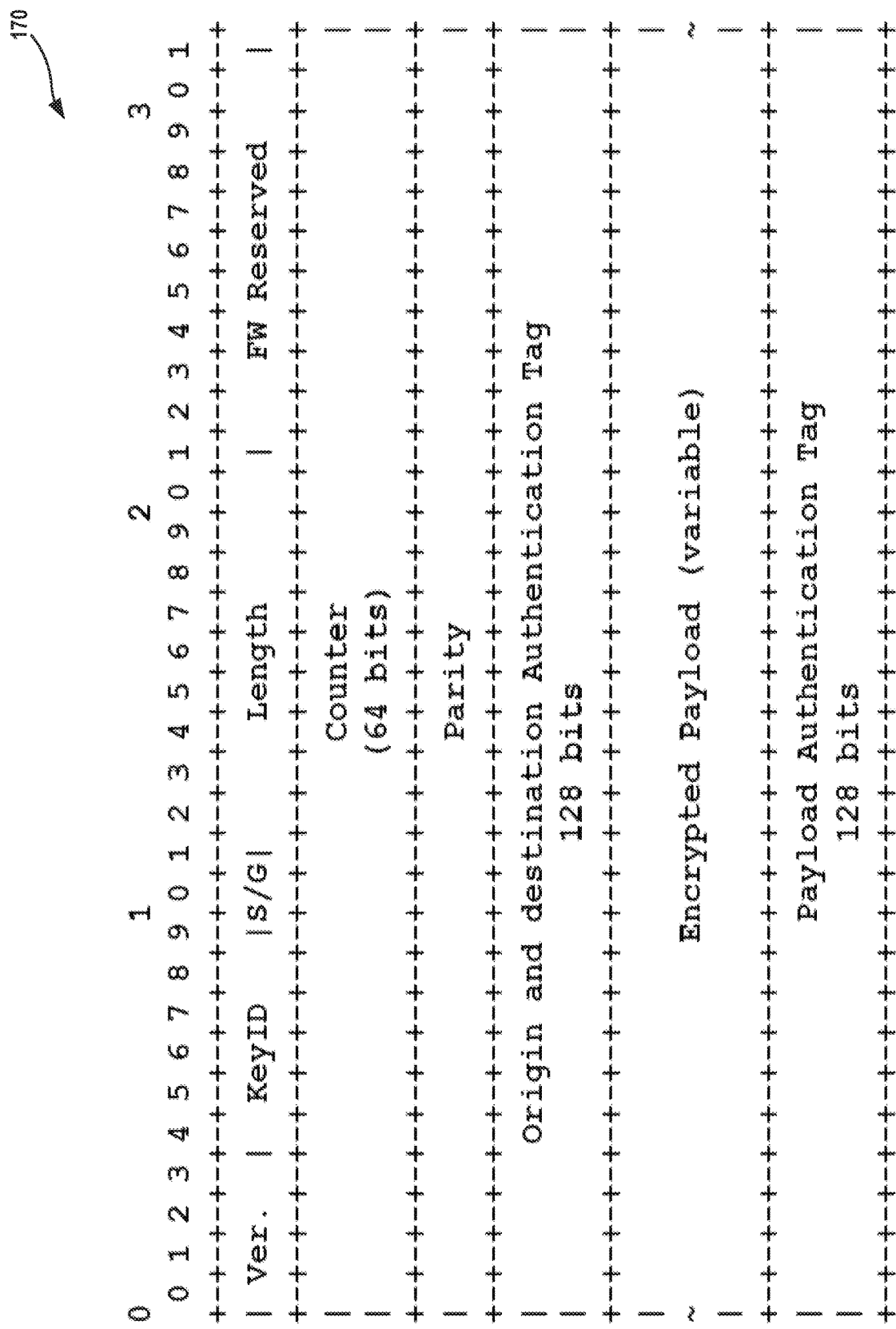
FIG. 7 is a conceptual diagram illustrating the structure of a crypto packet of this disclosure.

FIG. 7 is a conceptual diagram illustrating the structure of crypto packet 170 of this disclosure. HMD SoC 2 and peripheral SoC 4 may set the "version" field to the value of 0b0001 for crypto packet 170. HMD SoC 2 and peripheral SoC 4 may populate the "KeyID" field with data reflecting the channel ID of crypto packet 170. For example, HMD SoC 2 and peripheral SoC 4 may set the KeyID field to an index of the AES key used to encrypt or to be used for decryption of the encrypted payload of crypto packet 170. The two-bit field labeled as "S/G" denotes the identity of the encrypting device. HMD SoC 2 and peripheral SoC 4 may update this two-bit field during encryption to indicate whether the payload was encrypted at HMD 12 or was encrypted at peripheral device 6.

The receiving device parses and verifies this two-bit field (also referred to as a "compute unit/headset" field) to prevent decryption of self-encrypted packets. For example, peripheral device 6 is only enabled to decrypt crypto packet payloads encrypted at HMD 12, and HMD 12 is only enabled to decrypt crypto packet payloads encrypted at peripheral device 12. The two valid values for the compute unit/headset field are 10 and 01, while the values of 00 and 11 are invalid with respect to the compute unit/headset field. HMD SoC 2 and peripheral SoC 4 may set the "length" field to a value indicating the number of 16-byte data segments that follow the header of crypto packet 170. HMD SoC 2 and peripheral SoC 4 may fill in the "counter" field during encryption to reflect an AES incremental count that can be picked up during decryption for sequencing purposes.

HMD SoC 2 and peripheral SoC 4 may populate the "origin and destination authentication tag" field with data that protects the integrity of the encryption header of crypto packet 170. For example, the receiving SoC can identify malicious modifications of bits in the header, because the origin and destination authentication tag is created using a secret key that is not available to an attacker who maliciously modifies any header bits. HMD SoC 2 and peripheral SoC 4 may populate the "parity" field for packets without high definition content protection (i.e. non-HDCP packets) by performing an XOR operation between the first three 32-bit segments of the encryption header. The receiving SoC may verify encryption header integrity. HMD SoC 2 and peripheral SoC 4 complete the encapsulation of the encrypted payload by adding a trailer shown in FIG. 7 as a "payload authentication tag" that protects the payload data.

Figure 8:
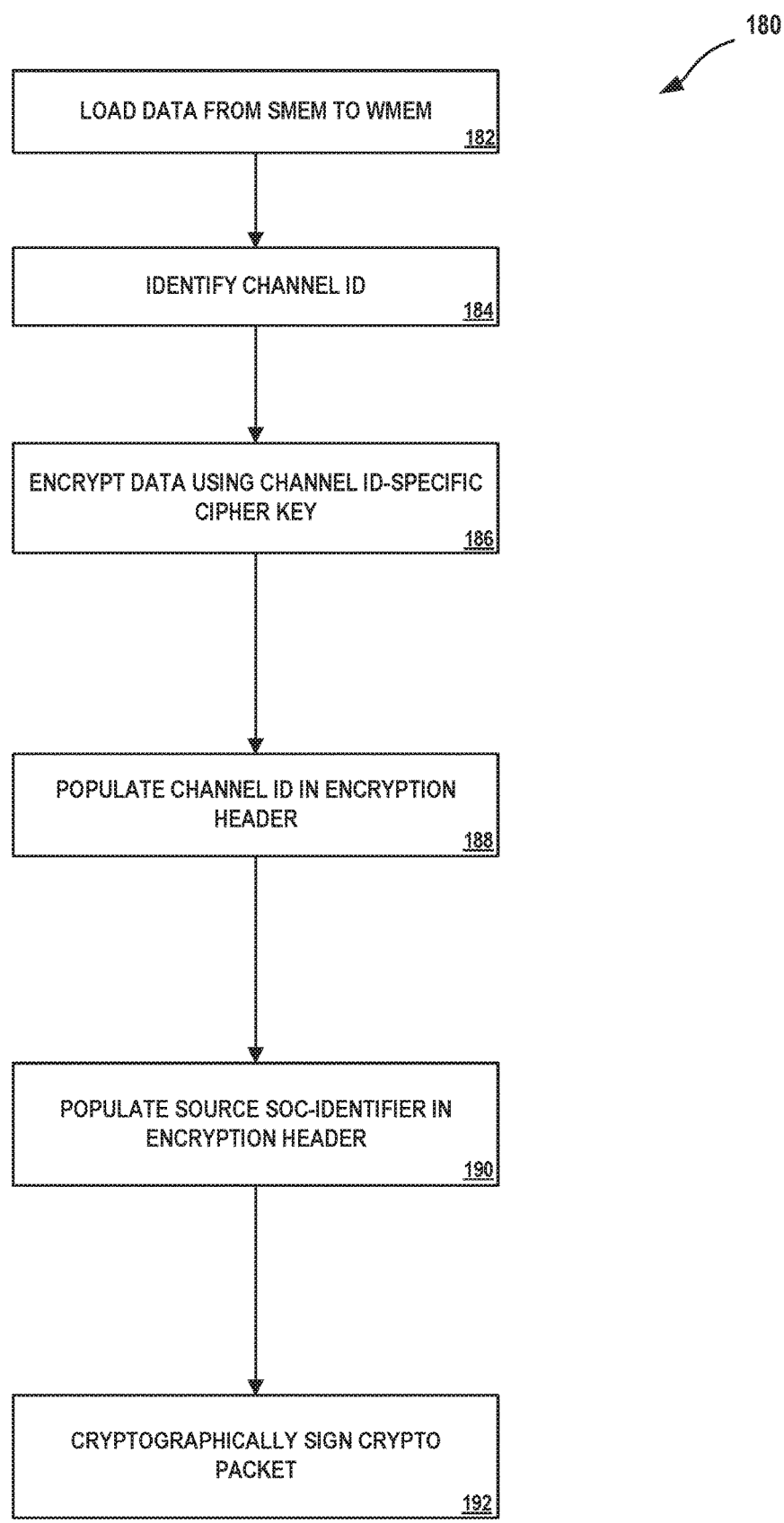
FIG. 8 is a flowchart illustrating an example process that SoCs of this disclosure may perform to communicate encrypted data in a DMA attack-preventive and loopback attack-preventive way, in accordance with the techniques of this disclosure.

FIG. 8 is a flowchart illustrating an example process 180 that HMD SoC 2 and peripheral SoC 4 may perform to communicate encrypted data in a DMA attack-preventive and loopback attack-preventive way, in accordance with the techniques of this disclosure. Process 180 is described as being performed by HMD SoC 2, as a non-limiting example. Process 180 may begin when DMA unit 134 loads data from SMEM 52 to WMEM 80 (182). In the particular example described with respect to FIG. 8, DMA unit 134 may load data from address space of SMEM 52 that is allocated to subsystem 128A, which is the source subsystem in this case.

In turn, security processor 120 may identify the channel ID on which the data loaded to WMEM 80 will be transmitted (184). For example, security processor 120 may use data available from address identifier unit 172 to form the channel ID for the data loaded from SMEM 52 to WMEM

80. Security processor 120 may cause AES engine 44 to encrypt the data loaded from SMEM 52 to WMEM 80 using a cipher key that is specific to the identified channel ID (186). That is, security processor 120 may select the cipher key from key store 168, based on a one-to-one mapping of channel ID to cipher key.

As part of the encapsulation process for the encrypted data, security processor 120 may populates the channel ID information for the encrypted data in a channel ID field of the encryption header of the crypto packet being formed (188). Security processor 120 may embed the channel ID in the encryption header in plain text format, thereby describing the traversal endpoints, at subsystem-level granularity. Additionally, security processor 120 embeds a source SoC identifier (e.g., a 1-bit field in the encryption header) of the crypto packet to identify HMD SoC 2 as the source SoC (190). Security processor 120 may also invoke AES engine 40 to compute a cryptographic signature using the cipher key selected from key store 168 based on channel ID-matching performed by address identifier unit 172. For example, AES engine 40 may apply the channel ID-specific cipher key to the source SoC-identifying bit and the channel ID information that security processor 120 embeds in the encryption header. In turn, security engine 120 cryptographically signs the entire crypto packet (plain-text encryption header and encrypted payload) using the cryptographic signature (192).

By binding the subsystem-level channel ID to the crypto packet according to process 180, security processor 120 provides the receiving SoC (peripheral SoC 4 in this example) information with which to select the channel ID-unique key for accurate decryption, and to route the decrypted payload data to the correct address space of shared memory ("SMEM") 76, thereby avoiding cross-subsystem data contamination that might occur as a result of DMA attacks. Also, by cryptographically binding the identity of the source SoC, the channel ID, and the channel ID-selected cipher key to each Tx crypto packet using the modified encryption header and the cryptographic signature of this disclosure, HMD SoC 2 enforces a strict traffic flow constraint that enables peripheral SoC 4 to drop malicious packets detected based on a signature mismatch. That is peripheral SoC 4 may, based on any detected signature mismatches, discard any data that is identified as potentially malicious (via loopback attack) before the data contaminates a prohibited partition in SMEM 52 or SMEM 76, as the case may be.

The techniques described in this disclosure may be implemented, at least in part, in hardware, software, firmware or any combination thereof. For example, various aspects of the described techniques may be implemented within one or more processors, including one or more microprocessors, DSPs, application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, fixed function circuitry, programmable circuitry, whether alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

As described by way of various examples herein, the techniques of the disclosure may include or be implemented in conjunction with an artificial reality system. As described, artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted device (HMD) connected to a host computer system, a standalone HMD, a mobile device or computing system, or any other hardware platform capable of providing artificial reality content to one or more viewers.

What is claimed is:

1. A system on a chip (SoC) comprising:
    an encryption engine configured to encrypt raw input data using a cipher key to form an encrypted payload; and
    a security processor configured to
        select the cipher key from a key store holding a plurality of cipher keys based on a channel ID describing a {source subsystem, destination subsystem} tuple for the encrypted payload;
        form an encryption header that includes the channel ID;
        encapsulate the encrypted payload with the encryption header that includes the channel ID to form a crypto packet; and
        transmit the crypto packet to a destination SoC that is external to the SoC.

2. The SoC of claim 1, wherein to select the cipher key based on the channel ID, the security processor is configured to select the cipher key on a unique per-channel ID basis.

3. The SoC of claim 1, wherein the security processor is configured to identify the channel ID at least in part by identifying, from a plurality of subsystems of the SoC, the source subsystem that originated the raw input data.

4. The SoC of claim 3, further comprising a direct memory access (DMA) engine configured to load the raw input data from an address memory reserved for the source subsystem in a shared memory (SMEM) to a wireless memory (WMEM) of the SoC.

5. The SoC of claim 1, wherein the SoC is coupled to an egress interface, and wherein to transmit the crypto packet to the destination SoC, the security processor is further configured to transmit the crypto packet to the destination SoC via the egress interface.

6. The SoC of claim 1, wherein the SoC comprises a source SoC, and wherein to form the encryption header, the security processor is further configured to include a source SoC-identifier in the encryption header.

7. The SoC of claim 6, wherein the security processor is further configured to:
apply the cipher key to the source SoC-identifier and the channel ID to form a cryptographic signature; and
sign the encryption header and encrypted payload of the crypto packet using the cryptographic signature.

8. The SoC of claim 1, wherein the SoC is integrated into one of a head-mounted device (HMD) of an artificial reality system or a peripheral device of the artificial reality system.

9. A system on a chip (SoC) comprising:
a security processor configured to
receive, via an ingress interface, a crypto packet;
decapsulate the crypto packet to obtain an encryption header and an encrypted payload;
parse the encryption header to obtain a channel ID describing a {source subsystem, destination subsystem} tuple for the encrypted payload; and
select a decryption key from a key store holding a plurality of decryption keys based on the channel ID obtained from the encryption header; and
a decryption engine configured to decrypt the encrypted payload using the decryption key to form a decrypted payload.

10. The SoC of claim 9, wherein to select the decryption key based on the channel ID, the security processor is configured select the decryption key on a unique per-channel ID basis.

11. The SoC of claim 9, further comprising a direct memory access (DMA) engine configured to load the decrypted payload from a wireless memory (WMEM) of the SoC to an address memory reserved for the destination subsystem in a shared memory (SMEM).

12. The SoC of claim 9, wherein the SoC comprises a destination SoC, and wherein the security processor is further configured to obtain, from the encryption header, a source SoC-identifier that identifies a source SoC external to the destination SoC.

13. The SoC of claim 12, wherein the security processor is further configured to verify the received crypto packet based on a combination of the source SoC-identifier obtained from the encryption header, the channel ID obtained from the encryption header, and a cryptographic signature with which the encryption header and encrypted payload of the crypto packet are signed.

14. The SoC of claim 9, wherein the SoC is integrated into one of a head-mounted device (HMD) of an artificial reality system or a peripheral device of the artificial reality system.

15. An artificial reality system comprising:
a head-mounted device (HMD) having an HMD system on a chip (SoC) comprising:
an encryption engine configured to encrypt raw input data using a cipher key to form an encrypted payload; and
a first security processor configured to:
select the cipher key from a key store holding a plurality of cipher keys based on a channel ID describing a {source subsystem, destination subsystem} tuple for the encrypted payload;
form an encryption header that includes the channel ID;
encapsulate the encrypted payload with the encryption header that includes the channel ID to form a crypto packet; and
transmit, via an egress interface, the crypto packet to a destination SoC.

16. The artificial reality system of claim 15, further comprising:
a peripheral device communicatively coupled to the HMD, the peripheral device having a peripheral SoC, wherein the peripheral SoC is the destination SoC, and wherein the peripheral SoC comprises:
a second security processor configured to:
receive, via an ingress interface, the crypto packet;
decapsulate the crypto packet to obtain the encryption header and the encrypted payload;
parse the encryption header to obtain the channel ID describing the {source subsystem, destination subsystem} tuple for the encrypted payload; and
select a decryption key from a key store holding a plurality of decryption keys based on the channel ID obtained from the encryption header; and
a decryption engine configured to decrypt the encrypted payload using the decryption key to form a decrypted payload.

17. The artificial reality system of claim 16, wherein to select the cipher key based on the channel ID, the first security processor is configured to select the cipher key on a unique per-channel ID basis, and wherein to select the decryption key based on the channel ID, the second security processor is configured select the decryption key on the unique per-channel ID basis.

18. The artificial reality system of claim 16, wherein the HMD SoC comprises a source SoC, wherein to form the encryption header, the first security processor is further configured to include a source SoC-identifier in the encryption header, and wherein the first security processor is further configured to:
apply the cipher key to the source SoC-identifier and the channel ID to form a cryptographic signature; and
sign the encryption header and encrypted payload of the crypto packet using the cryptographic signature.

19. The artificial reality system of claim 18, wherein the peripheral SoC comprises a destination SoC, wherein the second security processor is further configured to obtain, from the encryption header, the source SoC-identifier that identifies the HMD SoC as the source SoC, and wherein the second security processor is further configured to verify the received crypto packet based on a combination of the source SoC-identifier obtained from the encryption header, the channel ID obtained from the encryption header, and the cryptographic signature with which the encryption header and encrypted payload of the crypto packet are signed.

20. The artificial reality system of claim 16,
wherein the HMD SoC further comprises a first direct memory access (DMA) engine configured to load the raw input data from address memory reserved for the source subsystem in a first shared memory (SMEM) to a first wireless memory (WMEM) of the HMD SoC, and
wherein the peripheral SoC further comprises a second DMA engine configured to load the decrypted payload from a second wireless memory WMEM of the peripheral SoC to address memory reserved for the destination subsystem in a second SMEM of the peripheral device.

21. An artificial reality system comprising:
a peripheral device having a peripheral system on a chip (SoC) comprising:
  an encryption engine configured to encrypt raw input data using a cipher key to form an encrypted payload; and
  a first security processor configured to:
    select the cipher key from a key store holding a plurality of cipher keys based on a channel ID describing a {source subsystem, destination subsystem} tuple for the encrypted payload;
    form an encryption header that includes the channel ID;
    encapsulate the encrypted payload with the encryption header that includes the channel ID to form a crypto packet; and
    transmit, via an egress interface, the crypto packet to a destination SoC.

22. The artificial reality system of claim 21, further comprising:
a head-mounted device (HMD) communicatively coupled to the peripheral device, the HMD having an HMD SoC, wherein the HMD SoC is the destination SoC, and wherein the HMD SoC comprises:
  a second security processor configured to:
    receive, via an ingress interface, the crypto packet;
    decapsulate the crypto packet to obtain the encryption header and the encrypted payload;
    parse the encryption header to obtain the channel ID describing the {source subsystem, destination subsystem} tuple for the encrypted payload; and
    select a decryption key from a key store holding a plurality of decryption keys based on the channel ID obtained from the encryption header; and
  a decryption engine configured to decrypt the encrypted payload using the decryption key to form a decrypted payload.

* * * * *